(12) United States Patent
Vasyltsov et al.

(10) Patent No.: US 11,303,461 B2
(45) Date of Patent: *Apr. 12, 2022

(54) SECURITY DEVICE HAVING PHYSICAL UNCLONABLE FUNCTION

(71) Applicant: Samsung Electronics Co., Ltd., Suwon-si (KR)

(72) Inventors: Ihor Vasyltsov, Suwon-si (KR); Karpinskyy Bohdan, Suwon-si (KR); Kalesnikau Aliaksei, Hwaseong-si (KR); Yun-Hyeok Choi, Changwon-si (KR)

(73) Assignee: Samsung Electronics Co., Ltd.

( * ) Notice: Subject to any disclaimer, the term of this patent is extended or adjusted under 35 U.S.C. 154(b) by 79 days.

This patent is subject to a terminal disclaimer.

(21) Appl. No.: 16/677,901

(22) Filed: Nov. 8, 2019

(65) Prior Publication Data

US 2020/0099542 A1 Mar. 26, 2020

Related U.S. Application Data

(63) Continuation of application No. 16/021,494, filed on Jun. 28, 2018, now Pat. No. 10,498,544, which is a
(Continued)

(30) Foreign Application Priority Data

Feb. 6, 2014 (KR) .................. 10-2014-0013822

(51) Int. Cl.
*H04L 9/32* (2006.01)
*G06F 21/73* (2013.01)

(52) U.S. Cl.
CPC ............ *H04L 9/3278* (2013.01); *G06F 21/73* (2013.01)

(58) Field of Classification Search
CPC .......... G06F 21/73; G06F 21/70; G06F 21/71; H04L 9/32; H04L 9/3271
See application file for complete search history.

(56) References Cited

U.S. PATENT DOCUMENTS

| 6,161,213 | A | 12/2000 | Lofstrom | |
| 7,681,103 | B2 * | 3/2010 | Devadas | G06F 21/79 714/752 |

(Continued)

FOREIGN PATENT DOCUMENTS

| EP | 2590355 | 5/2013 |
| JP | 2012105056 | 5/2012 |
| JP | 2013131867 | 7/2013 |

OTHER PUBLICATIONS

Murphy et al "Self-timed physically unclonable functions" 2012 5th International Conference on New Technologies, Mobility and Security (NTMS) 2012 (Year: 2012).*

(Continued)

*Primary Examiner* — Saleh Najjar
*Assistant Examiner* — Devin E Almeida
(74) *Attorney, Agent, or Firm* — Onello & Mello, LLP

(57) ABSTRACT

The inventive concept provides a security device capable of reducing an area of a die required for implementation of a stable PUF by increasing the value of entropy from a predefined number of entropy sources and/or minimizing a blind zone of a validity checking module. The security device uses an asynchronous configuration to minimize a blind zone. In various embodiments of the inventive concept, the blind zone is generated only in a period when a reset signal is at a first logic level. Therefore, it is possible to minimize the blind zone by minimizing a period in which the reset signal is at such logic level. A semiconductor device, semiconductor package, and/or smart card can be
(Continued)

provided with such security device, as well as a method for determining a validity of a random signal using a semiconductor security device.

19 Claims, 23 Drawing Sheets

Related U.S. Application Data continuation of application No. 14/460,982, filed on Aug. 15, 2014, now Pat. No. 10,044,513.

(60) Provisional application No. 61/872,781, filed on Sep. 2, 2013.

(56) References Cited

U.S. PATENT DOCUMENTS

| | | | |
|---|---|---|---|
| 7,898,283 | B1 | 3/2011 | Koushanfar et al. |
| 8,054,098 | B2 | 11/2011 | Koushanfar et al. |
| 8,159,260 | B1 | 4/2012 | Behrends et al. |
| 8,159,857 | B2 | 4/2012 | Gammel et al. |
| 8,176,106 | B2 | 5/2012 | Schrijen et al. |
| 8,274,306 | B1 | 9/2012 | Garcia |
| 8,285,767 | B2 * | 10/2012 | Chandra ............... G06F 7/588 708/251 |
| 8,290,150 | B2 | 10/2012 | Erhart et al. |
| 8,300,450 | B2 | 10/2012 | Christensen et al. |
| 8,370,787 | B2 | 2/2013 | Koushanfar et al. |
| 8,379,856 | B2 * | 2/2013 | Potkonjak ............ H04L 9/0866 380/255 |
| 8,387,071 | B2 | 2/2013 | Potkonjak et al. |
| 8,415,969 | B1 | 4/2013 | Ficke et al. |
| 8,432,250 | B2 | 4/2013 | Chmelar |
| 8,458,489 | B2 | 6/2013 | Beckmann et al. |
| 8,850,608 | B2 | 9/2014 | Tehranipoor et al. |
| 8,874,632 | B2 * | 10/2014 | Vasyltsov ............... G06F 7/588 708/255 |
| 8,981,810 | B1 * | 3/2015 | Trimberger .......... H03K 19/003 326/8 |
| 9,021,001 | B2 * | 4/2015 | Yamamoto ............. G06F 7/582 708/250 |
| 9,184,751 | B2 | 11/2015 | Pfeiffer et al. |
| 9,722,805 | B2 * | 8/2017 | Suzuki .................. G09C 1/00 |
| 10,109,338 | B2 * | 10/2018 | Chae ................ G11C 11/40607 |
| 10,331,413 | B2 * | 6/2019 | Ho ............................ G06F 7/58 |
| 2006/0271793 | A1 | 11/2006 | Devadas et al. |
| 2007/0067374 | A1 | 3/2007 | Ikentani et al. |
| 2009/0083833 | A1 | 3/2009 | Ziola et al. |
| 2010/0322418 | A1 | 12/2010 | Potkonjak |
| 2011/0050279 | A1 | 3/2011 | Koushanfar et al. |
| 2011/0055649 | A1 | 3/2011 | Koushanfar et al. |
| 2011/0317829 | A1 | 12/2011 | Ficke et al. |
| 2012/0037711 | A1 | 2/2012 | Kim et al. |
| 2012/0093308 | A1 | 4/2012 | Choi |
| 2013/0019324 | A1 * | 1/2013 | Tehranipoor ............ G09C 1/00 726/34 |
| 2013/0047209 | A1 | 2/2013 | Satoh et al. |
| 2013/0082733 | A1 | 4/2013 | Shimizu |
| 2013/0093502 | A1 | 4/2013 | Kim et al. |
| 2013/0138710 | A1 | 5/2013 | Yamamoto et al. |
| 2013/0147511 | A1 | 6/2013 | Koeberl et al. |
| 2014/0327469 | A1 * | 11/2014 | Pfeiffer ................ H03K 19/003 326/8 |
| 2015/0026545 | A1 * | 1/2015 | Yu ....................... H03M 13/152 714/780 |
| 2015/0270839 | A1 * | 9/2015 | Mucha ................... G06F 21/44 326/8 |
| 2015/0312047 | A1 | 10/2015 | Suzuki | |

OTHER PUBLICATIONS

Dung et al "A VLSI implementation of variation-free PUF-based processor for RFID applications" 2013 CACS International Automatic Control Conference (CACS) 2013 (Year: 2013).*

Kim "Reliable Physical Unclonable Function based on Asynchronous Circuits" International Journal of Applied Engineering Research 2018 (Year: 2018).*

Mureddu et al "Efficient design of oscillator based physical unclonable functions on flash fpgas" 2017 IEEE 2nd International Verification and Security Workshop (IVSW) 2017 (Year: 2017).*

Zalivaka et al. "Multi-valued arbiters for quality enhancement of PUF responses on FPGA implementation" 2016 21st Asia and South Pacific design automation conference (ASP-DAC) 2016 (Year: 2016).*

Eiroa et al "Using physical unclonable functions for hardware authentication: A survey" Proceedings XXV Conference on Design of Circuits and Integrated Systems (2010) (Year: 2010).*

Korean Notice of Allowance dated May 27, 2020 issued in corresponding Korean Application No. 10-2014-0013822.

"Security Device Having Physical Unclonable Function" Specification, Drawings, and Prosecution History of United States U.S. Appl. No. 14/460,982, filed Aug. 15, 2014, by Ihor Vasyltsov, et al., now U.S. Pat. No. 10,044,513, issued Aug. 7, 2018.

Katzenbeisser et al. "PUFs: Myth, Fact or Busted? A Security Evaluation of Physically Unclonable Functions (PUFs) Cast in Silicon" Technische Universitat Darmstadt (CASED), Germany; Technisch Universitat Darmstadt and Fraunhofer SIT Darmstadt, Germany; KU Leuven, ESAT/COSIC, Leuven, Belgium; Leixlip.

Kumar et al. "Extended Abstract: The Butterfly PUF: Protecting IP on every FPGA" Philips Research Europe, 5656 AE, Eindoven, The Netherlands K.U.Leuven, ESAT/COSIC, B-3001 Leuven-Heverlee, Belgium.

Lee et al. "A technique to build a secret key in integrated circuits for identification and authentication applications" MIT Computer Science and Artificial Intelligence Laboratory (CSAIL), Cambridge, MA, USA Computation Structures Group, Memo 472 (2004).

Lofstrom et al. "IC Identification circuit using device mismatch" IEEE International Solid-State Circuits Conference (2000).

Maes et al. "Experimental evaluation of physically unclonable functions in 65 nm CMOS" Ku Leuven: ESAT-COSIC and IBBT Leuven, Belgium http://www.esat.kuleuven.be; Intel Ireland Leixlip, Ireland http://www.intel.com; Intrinsic-ID Eindhoven, The Netherlands http://www.intrinsic-id.com.

Maes et al. "Physically unclonable functions: a study on the state of the art and future research directions" IAP Program P6/26 BCRYPT of the Belgian state and K.U.Leuven-BOF funding (OT/06/04).

Suh et al. "Physical unclonable functions for device authentication and secret key generation", DAC 2007, Jun. 4-8, 2007, San Diego, CA, USA (2007).

"Security Device Having Physical Unclonable Function" Specification, Drawings, and Prosecution History of United States U.S. Appl. No. 16/021,494, filed Jun. 28, 2018, by Ihor Vasyltsov, et al.

* cited by examiner

SECURITY DEVICE HAVING PHYSICAL UNCLONABLE FUNCTION

CROSS-REFERENCE TO RELATED APPLICATIONS

This application is a continuation application of U.S. Ser. No. 16/021,494 filed Jun. 28, 2018, which is a continuation of U.S. Ser. No. 14/460,982 filed Aug. 15, 2014, issued on Aug. 7, 2018 as U.S. Pat. No. 10,044,513, which claims the benefit under 35 USC 119(e) of U.S. Provisional Application No. 61/872,781, filed on Sep. 2, 2013, in the United States Patent and Trademark Office, the disclosure of which is incorporated herein in its entirety by reference. In addition, this application claims the benefit under 35 USC 119 of Korean Patent Application No. 10-2014-0013822, filed on Feb. 6, 2014, in the Korean Intellectual Property Office, the disclosure of which is incorporated herein in its entirety by reference.

FIELD

The inventive concept relates to a computer security device, and more particularly, to a computer security device having a physical un-clonable function (PUF).

BACKGROUND

Recently, as communication technology and smart device related technology are rapidly developed, a demand for establishing a security system for safely using a communication system and a smart device is also increasing. A basic method of providing security in the communication system and the smart device is to mount a security device implemented not by a memory, but by hardware logic in the communication system and the smart device. According to such methods, a check is performed to determine whether a malignant code exists or an authentication is performed when a security chip is driven and then, software such as an operating system (OS) is driven. Recently, a security technology having the PUF is receiving attention. When the PUF is used, it is possible to prevent an important key, such as an authentication key stored in the security device, from being copied.

A security device can include components to provide digital random signals and a validity detector to detect a validity of the digital random signals and to generate validity signals that represent a detection result. Since a conventional validity detector uses a synchronous configuration, a blind zone is generated every cycle. To be specific, in the conventional configuration, since validity of a digital random signal is detected based on a generated synchronous clock, in a period when the synchronous clock is deactivated, although transition of the digital random signal occurs, it is not possible to detect the transition of the digital random signal.

SUMMARY

The inventive concept provides a security device capable of reducing an area of a die required for implementation of a stable PUF by increasing the value of entropy from a predefined number of entropy sources and/or minimizing a blind zone of a validity checking module.

In various embodiments, a security device according to aspects of the inventive concept uses an asynchronous configuration to minimize a blind zone. In various embodiments of the inventive concept, the blind zone is generated only in a period when a reset signal is logic '1'. Therefore, it is possible to minimize the blind zone by minimizing a period in which the reset signal is logic '1'.

According to an aspect of the inventive concept, there is provided a security device. The security device includes a first entropy source configured to generate a first analog random signal; a second entropy source configured to generate a second analog random signal; a first digitizer configured to digitize the analog random signal to generate a first digital random signal; a second digitizer configured to digitizer the analog random signal to generate a second digital random signal; a first combination unit configured to connect at least one of the first and second entropy sources and at least one of the first and second digitizers; a validity detecting unit configured to detect validity of the first digital random signal to generate a first validity signal and to detect validity of the second digital random signal to generate a second validity signal; and a finalizer configured to determine whether to exclude the first digital random signal and the second digital random signal based on the first validity signal and the second validity signal and to output a final digital random signal in accordance with the determined result.

In some embodiments, at least one of the first entropy source and the second entropy source comprises an inverting unit formed so that an input terminal and an output terminal are connected, and the inverting unit comprises at least one of an inverter, a NAND gate, or a NOR gate, or a combination thereof.

In some embodiments, at least one of the first digitizer and the second digitizer comprises an amplifier configured to amplify an analog random signal, wherein the amplifier comprises at least one of an inverter, an OR gate, an AND gate, or a NAND gate whose input and output terminals are connected, and a NOR gate whose input and output terminals are connected.

In some embodiments, at least one of the first digitizer and the second digitizer comprises a storage unit configured to store the amplified analog random signal as a digital random signal.

In some embodiments, the security device further comprises a storage unit configured to store the first digital random signal or the second digital random signal, and a second combination unit connected between the first digitizer or the second digitizer and the storage unit.

In some embodiments, the first combination unit comprises: a decoder configured to generate first to fourth operation signals in response to a selection signal; a first switching device configured to connect the first entropy source and the first digitizer in response to the first operation signal; a second switching device configured to connect the first entropy source and the second digitizer in response to the second operation signal; a third switching device configured to connect the second entropy source and the first digitizer in response to the third operation signal; and a fourth switching device configured to connect the second entropy source and the second digitizer in response to the fourth operation signal.

In some embodiments, the first combination unit comprises a multiplexer configured to transmit one of the first analog random signal and the second analog random signal to an output port in response to a selection signal. In some embodiments, the multiplexer comprises: a first passive device configured to be turned on by the selection signal in a first state to transmit the first analog random signal, and a second passive device configured to be turned on by the selection signal in a second state to transmit the second analog random signal.

In some embodiments, the first combination unit comprises a passive crossbar configured to distribute the first and second analog random signals to the first and second digitizers in response to a selection signal of one bit.

In some embodiments, the passive crossbar comprises: a first passive device configured to be turned on by the selection signal in a first state to transmit the first analog random signal to the first digitizer; a second passive device configured to be turned on by the selection signal in a first state to transmit the second analog random signal to the second digitizer; a third passive device configured to be turned on by the selection signal in a second state to transmit the first analog random signal to the second digitizer; and a fourth passive device configured to be turned on by the selection signal in a second state to transmit the second analog random signal to the first digitizer.

According to another aspect of the inventive concept, there is provided a security device. The security device includes: a random signal generating unit configured to generate digital random signals and a validity detecting unit configured to asynchronously detect transition of the digital random signals to detect validity of the digital random signals. The validity detecting unit comprises: an asynchronous detector configured to detect transition of the digital random signals, and a validity signal generator configured to generate validity signals in response to output signals of the asynchronous detector.

In some embodiments, the asynchronous detector comprises a first storage unit configured to receive the digital random signal as a clock signal and to output data in response to a clock signal and a second storage unit configured to receive a signal obtained by inverting the digital random signal as a clock signal and to output data in response to a clock signal.

In some embodiments, the validity signal generator comprises an XOR gate or a NOR gate.

In some embodiments, the asynchronous detector comprises: a first input terminal for receiving a digital random signal; a second input terminal for receiving an inverted signal of the digital random signal; and a selection terminal for receiving the digital random signal or the inverted signal of the digital random signal.

In some embodiments, the random signal generating unit comprises at least one of a static random access memory (SRAM) PUF, a ring oscillator PUF, a butterfly PUF, a flip-flop PUF, and an arbiter PUF.

In some embodiments, the random signal generating unit comprises an entropy source configured to generate an analog random signal and a digitizer configured to digitize the analog random signal to generate a digital random signal.

In accordance with another aspect of the invention, provided is a method of determining a validity of a random signal using a semiconductor security device. The method comprises: digitizing at least one analog random signal to generate a digitized random signal; detecting a transition of the digital random signal by an asynchronous detector, which includes: providing a first clock signal to the asynchronous detector; at a falling edge of the first clock signal, the asynchronous detector setting a reset signal to a first logic level and in response performing a reset operation; at a rising edge of the first clock signal, the asynchronous detector setting the reset signal to a second logic level and in response detecting a validity of the digital random signal and outputting an output signal; and generating a validity signal in response to the output signal from the asynchronous detector by a validity signal generator.

In some embodiments, the reset single first logic level is a "1" and the reset signal second logic level is a "0."

In some embodiments, the method includes minimizing the time the reset signal is at the first logic level to minimize a blind zone, wherein the blind zone is a time period in which the validity detecting unit VD does not detect a transition or a fluctuation of the digital random signal.

In some embodiments, minimizing the blind zone includes controlling a ratio between the first clock signal and a second clock signal, wherein the ratio is at least 4:1, so that a period of the first clock signal is ¼ or less than that of the second clock signal.

In some embodiments, the method further comprises generating the at least one analog random signal by at least one entropy source.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1:
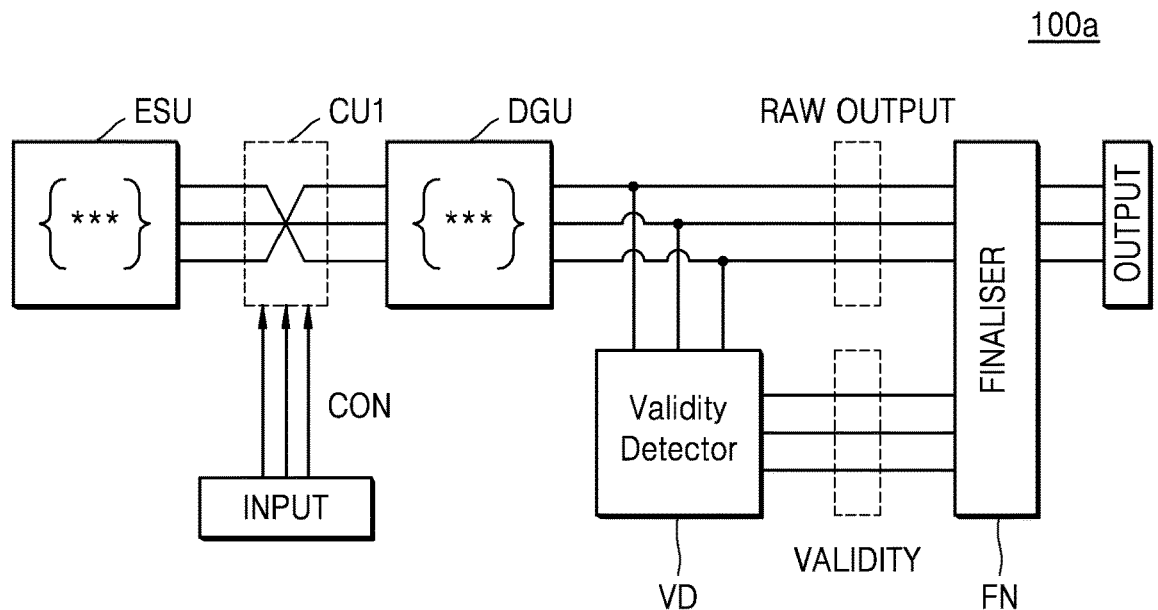
FIG. 1 is a block diagram schematically illustrating an embodiment of a security device according to aspects of the inventive concept.

Embodiments of the inventive concept will now be described more fully with reference to the accompanying drawings. The inventive concept may, however, be embodied in many different forms and should not be construed as limited to the exemplary embodiments set forth herein. Rather, these embodiments are provided so that this disclosure will be thorough and complete, and will fully convey the scope of the inventive concept to one of ordinary skill in the art.

The terms used in the specification are used for describing specific embodiments and are not used for limiting the inventive concept. A singular expression includes a plural expression unless explicitly described to the contrary. The term "comprise" and/or "comprising" will be understood to imply the inclusion of shapes, numbers, steps, operations, elements, parts, and/or combinations of the above that are described in the specification, but not the exclusion of one or more other shapes, numbers, steps, operations, elements, parts, and/or combinations of the above.

It will be understood that, although the terms first, second, etc., may be used herein to describe various elements, components, regions, and/or sections, these elements, components, regions, and/or sections should not be limited by these terms. These terms are only used to distinguish one element, component, region, or section from another element, component, region, or section. Thus, a first element, component, region, or section discussed below could be termed a second element, component, region, or section without departing from the teachings of the inventive concept.

Hereinafter, the embodiments in accordance with the inventive concept will be described with reference to the accompanying drawings schematically illustrating aspects of the inventive concept. In the drawings, the illustrated shapes may be changed in accordance with a manufacturing technology and/or allowance. Therefore, the embodiments of the inventive concept should not be interpreted as being limited to specific shapes of regions illustrated in the specification and may include changes in shapes caused by manufacturing.

FIG. 1 is a block diagram schematically illustrating an embodiment of a security device 100a according to aspects of the inventive concept.

Referring to the embodiment of FIG. 1, the security device 100a may include an entropy source unit ESU, a digitizing unit DGU, a first combination unit CU1 a validity detecting unit VD, and a finalizer FN.

Figure 3:
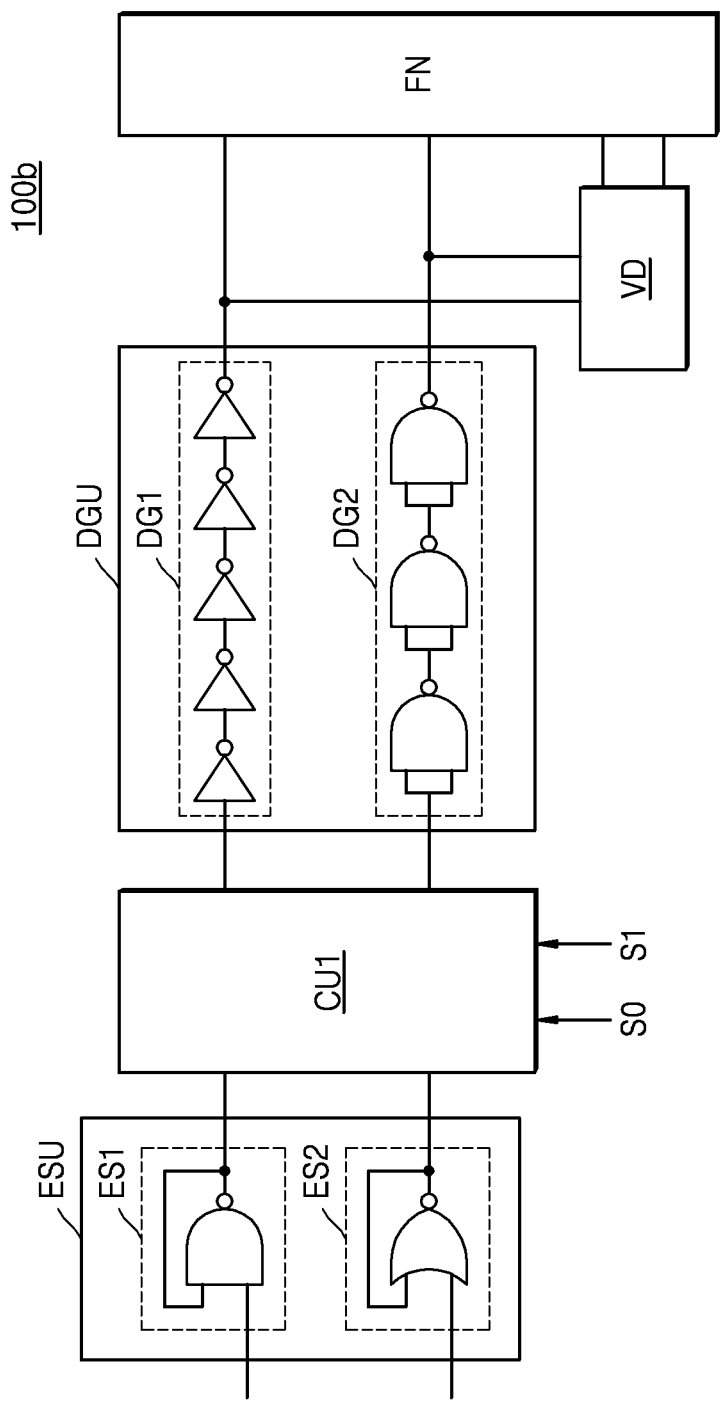
FIG. 3 is a block diagram schematically illustrating another embodiment of a security device according to aspect of the inventive concept.

The entropy source unit ESU may include a plurality of entropy sources (refer, for examples, to ES1 and ES2 of FIG. 3). The entropy source may be configured to generate an analog random signal and the analog random signal may be a metastable signal.

For example, in order to generate the metastable signal, the entropy source may include an inverting unit for inverting an input signal and to output the inverted input signal, where an input terminal and an output terminal of the inverting unit may be connected. That is, the input terminal and the output terminal may be connected in the form of a loop. Hereinafter, an operation of the inverting unit will be described based on an inverter (e.g., refer to FIG. 4) whose input and output terminals are connected, as an example of the inverting unit.

Since the input terminal and the output terminal of the inverter are connected, an output voltage of the inverter converges to a metastable level and remains at that level. Due to thermal noise, the output voltage of the inverter stochastically changes at the metastable level.

The digitizing unit DGU may include a plurality of digitizers (e.g., refer to DG1 and DG2 of FIG. 3). The digitizers may be configured to digitize analog random signals. As a result, digital random signals may be generated in this manner.

For example, in order to generate the digital random signals, the digitizers may include at least one serially connected amplifier. The analog random signals may be amplified by the amplifier to be amplified to levels that may be sampled by a sampling unit (not shown). The amplifier may include an inverting unit.

The first combination unit CU1 may be configured to connect at least one entropy source in the entropy source unit ESU with at least one digitizer in the digitizing unit DGU in response to a selection signal. Various combinations between the entropy source and the digitizer may be generated by the first combination unit CU1. Due to the various combinations, an area of a die required for implementing a random number generating unit may be reduced.

The validity detecting unit VD may be configured to detect a validity of the digital random signals and to generate validity signals that represent a detection result. The digital random signals may be used as random signals for generating a PIN that may be used as an authentication key. In this case, the PIN must have a time-invariant characteristic in which a value of the PIN does not vary in accordance with a peripheral environment. The validity detecting unit VD may determine the time-invariant characteristics of the digital random signals, may generate the validity signals based on the determination result, and may transmit the generated validity signals to the finalizer FN.

The finalizer FN may determine whether to exclude the digital random signals based on the validity signals. The finalizer FN may receive a plurality of digital random signals RAW OUTPUT from the plurality of digitizers and may receive the validity signals VALIDITY for the plurality of digital random signals from the validity detecting unit VD. The finalizer FN may exclude digital random signals that do not have time-invariant characteristics from the plurality of digital random signals based on the validity signals and may output the remaining digital random signals as final digital random signals.

When the entropy sources and the digitizer are serially connected, in order to implement a plurality of unit random number generating units, the entropy sources and the digitizers of the same number as that of unit random number generating units must be provided. For example, when n entropy and n digitizers are implemented, only n connection combinations may be obtained, that is, only n unit random number generating units may be implemented, which means that the number of connection combinations of the unit random number generating units linearly increases in proportion to the number of entropy sources and digitizers.

On the other hand, in the security device according to the inventive concept, various combinations between the entropy sources and the digitizers may be obtained by the first combination unit. For example, when the n entropy sources and the n digitizers are implemented, n*n connection combinations may be obtained, that is, n*n unit random number generating units may be implemented, which means that the number of connection combinations of the unit random number generating units exponentially increases in accordance with the number of entropy sources and digitizers.

For example, when the n*n connection combinations of the unit random number generating units are to be obtained, in the security device according to the inventive concept, the above connection combinations may be obtained only by the n entropy sources and the n digitizers. When it is assumed that an implementation area of the entropy source and that of the digitizer are A, the total implementation area is 2*n*A.

On the other hand, in a security device in accordance with a serial connection configuration (or a configuration of a common random number generating device), in order to obtain n*n combinations of unit random number generating units, n*n entropy sources and n*n digitizers must be provided. Therefore, when it is assumed that an implementation area of an entropy source and that of a digitizer are A, the total implementation area is n*n*A.

Figure 2:
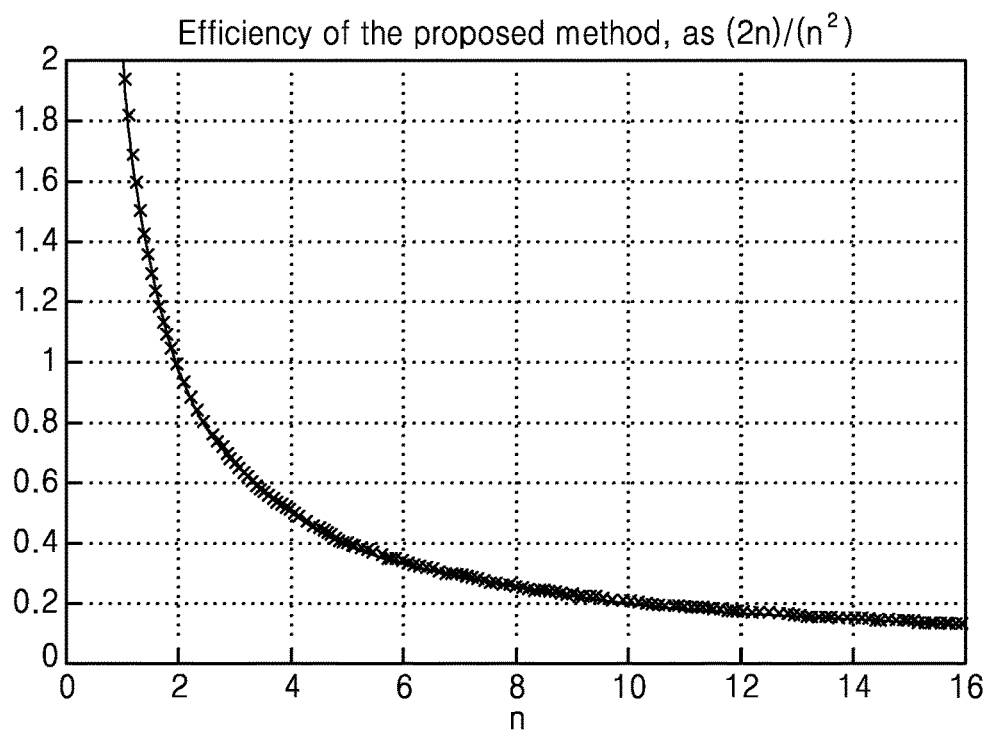
FIG. 2 is a graph illustrating a ratio between an area occupied by a random number generating unit of a serial connection configuration and an area occupied by a random number generating unit in a security device according to the inventive concept.

FIG. 2 is a graph illustrating a ratio between an area occupied by a random number generating unit of a serial connection configuration and an area occupied by a random number generating unit in a security device according to the inventive concept.

As described above, an area ratio of the configuration using the combination units to the serial connection configuration may be calculated as 2*n/n^2. As illustrated in FIG. 2, it is noted that the area ratio is reduced as the number n of connection combinations increases. As a result, as the number of required connection combinations increases, the area occupied by a random number generating device including combination units is smaller than that occupied by a common random number generating device and area efficiency of the random number generating device including the combination units increases.

The inventive concept can be applied not only to a configuration in which entropy sources and digitizers are serially connected, but also to another configuration based on a static random access memory (SRAM) PUF, a ring oscillator PUF, a butterfly PUF, a flip-flop PUF, and an arbiter PUF.

FIG. 3 is a block diagram schematically illustrating another embodiment of a security device 100b according to aspects of the inventive concept. A security device 100b according to the embodiment may be a modification of the security device 100a embodiment of FIG. 1. Hereinafter, redundant description of the present embodiment will be omitted.

Referring to the embodiment of FIG. 3, an entropy source unit ESU may include a first entropy source ES1 configured to generate a first analog random signal and a second entropy source ES2 configured to generate a second analog random signal. At least one of the first entropy source ES1 and the second entropy source ES2 may include an inverting unit formed so that an input terminal and an output terminal are connected. The inverting unit may include at least one of an inverter INV, a NAND gate, and/or a NOR gate and the input terminal and the output terminal of the inverting unit may be connected in the form of a loop.

Figure 4:
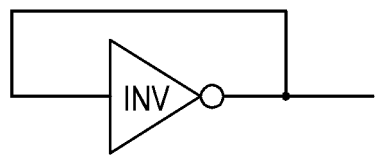
FIGS. 4 to 11 illustrate detailed exemplary embodiments of a single entropy source.
Figure 5:
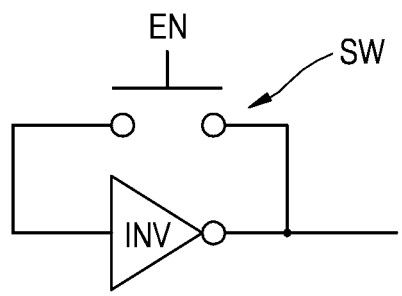

Detailed configurations of the inverting unit are illustrated in FIGS. 4 to 11. Referring to FIG. 4, the inverting unit may be an inverter INV whose input and output terminals are connected, depicting various embodiments thereof. In some embodiments, as illustrated in FIG. 5, a switch SW may be connected between the input terminal and the output terminal of the inverter INV. The switch SW may be turned on and off in response to an enable signal EN received from the outside, external to the ESU and/or the security device.

When the switch SW is turned on, the input terminal and the output terminal of the inverter INV are connected. In this case, an output voltage of the inverter INV converges to a metastable level and remains at that level. Due to thermal noise, the output voltage of the inverter INV stochastically changes at the metastable level.

Figure 6:
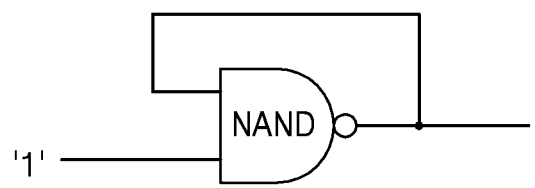
Figure 7:
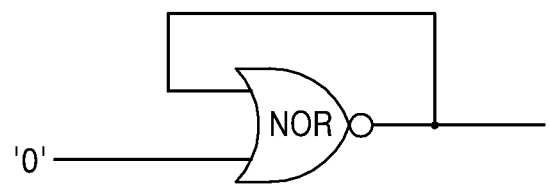

Referring to the embodiments of FIGS. 6 and 7, the inverting unit may be a NAND gate or a NOR gate whose input and output terminals are connected. When the enable signal EN (for example, a logic "1") is input to the input terminal of the NAND gate, since the input terminal and the output terminal of the NAND gate are connected, an output voltage of the NAND gate converges to a metastable level. When the enable signal EN (for example, a logic "0") is input to the input terminal of the NOR gate, since the input terminal and the output terminal of the NOR gate are connected, an output voltage of the NOR gate converges to a metastable level.

Figure 8:
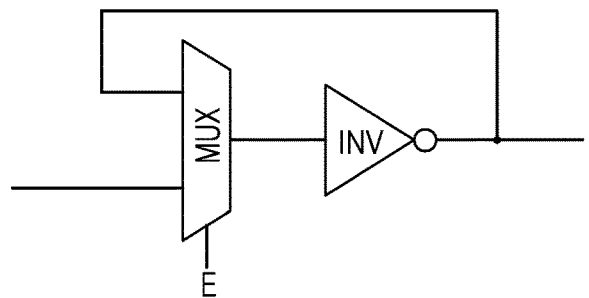

Referring to the embodiment of FIG. 8, the inverting unit may further include a multiplexer (MUX) and an output terminal of the inverting unit (INV) and a first input terminal of the multiplexer may be connected together. Therefore, in accordance with a selection signal E applied to the multiplexer, an output voltage of the inverting unit may converge to a metastable level or a signal connected to a second input terminal of the multiplexer may be transmitted to the inverting unit.

In FIG. 8, the inverter INV is illustrated as the inverting unit. However, the inventive concept is not limited thereto. The inverting unit of FIG. 8 may be implemented by a NAND gate and/or a NOR gate, rather than the inverter INV. In this case, input terminals of the NAND gate and the NOR gate may be configured to be connected.

Figure 9:
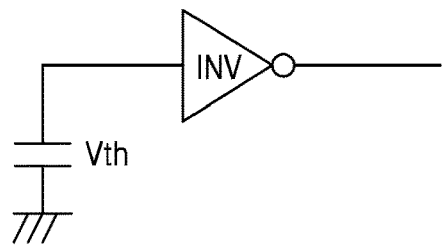
Figure 10:
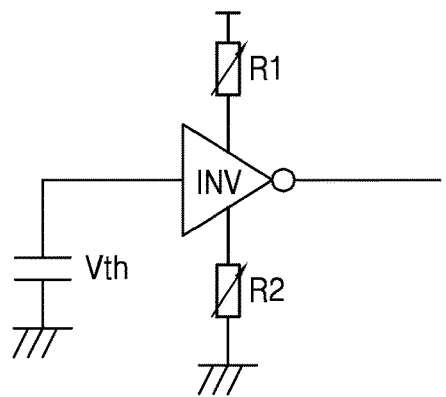
Figure 11:
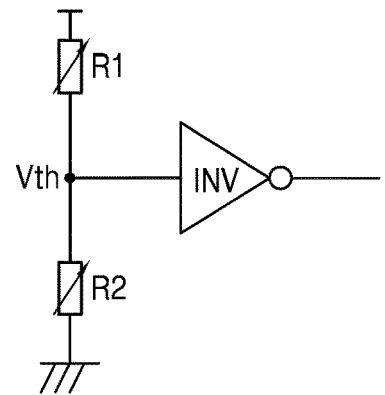

The embodiment of FIG. 9 illustrates a configuration in which the inverting unit is formed of the inverter INV and a threshold voltage Vth is applied to the input terminal of the inverter INV. Due to the thermal noise of the threshold voltage, the output voltage of the inverter INV may stochastically change. The embodiment of FIG. 10 illustrates a configuration in which variable resistances (R1 and R2) connected to the inverter INV are further implemented in addition to the configuration of FIG. 9 and the threshold voltage characteristic of the inverter INV may be controlled by the variable resistances. The embodiment of FIG. 11 illustrates a configuration in which the threshold voltage Vth applied to the inverter INV may be controlled by changing the variable resistances.

Referring to FIG. 3 again, the first entropy source ES1 may include the NAND gate illustrated in FIG. 6. The second entropy source ES2 may include the NOR gate illustrated in FIG. 7. It will be easily understood that the configurations of the first entropy source ES1 and the second entropy source ES2 are exemplary and one of the configurations illustrated in FIGS. 4 to 11 may optionally alternatively be used.

The digitizing unit DGU may include a first digitizer DG1 configured to digitize an analog random signal to generate a first digital random signal and a second digitizer DG2 configured to digitize an analog random signal to generate a second digital random signal.

The first digitizer DG1 and/or the second digitizer DG2 may be configured to receive a metastable signal output from the first entropy source ES1 and/or the second entropy source ES2, to amplify the metastable signal, and to output a digital random signal. The first digitizer DG1 and/or the second digitizer DG2 may include at least one serially connected inverting unit (for example, the inverter or the NAND gate). The metastable signal input to the first digitizer DG1 and/or the second digitizer DG2 may be amplified to a samplable level while passing through the at least one inverting unit.

Although not shown, the first digitizer DG1 and/or the second digitizer DG2 may include a storage unit (for example, a sampling flip-flop). The storage unit may be configured to perform a sampling operation and to store the analog random signal amplified by the at least one inverting unit in the first digitizer DG1 and/or the second digitizer DG2 as the digital random signal.

The first combination unit CU1 may be configured to connect at least one of the first entropy source ES1 and the second entropy source ES2 to at least one of the first digitizer DG1 and the second digitizer DG2 based on at least one selection signal S0 and S1. Detailed exemplary configurations of the first combination unit CU1 will be described with reference to the embodiments of FIGS. 12, 16, and 19 to 26.

The validity detecting unit VD may be configured to detect a validity of the first digital random signal output by the first digitizer DG1 to generate a first validity signal and to detect a validity of the second digital random signal to generate a second validity signal. Detailed exemplary configurations of the validity detecting unit VD will be described later with reference to the embodiments of FIGS. 28 to 38.

The finalizer FN may be configured to determine whether to exclude the first digital random signal and the second digital random signal based on the first validity signal and the second validity signal and to output a final digital random signal in accordance with the determination result. A detailed exemplary configuration of the finalizer FN will be described later with reference to the embodiment of FIG. 39.

Figure 12:
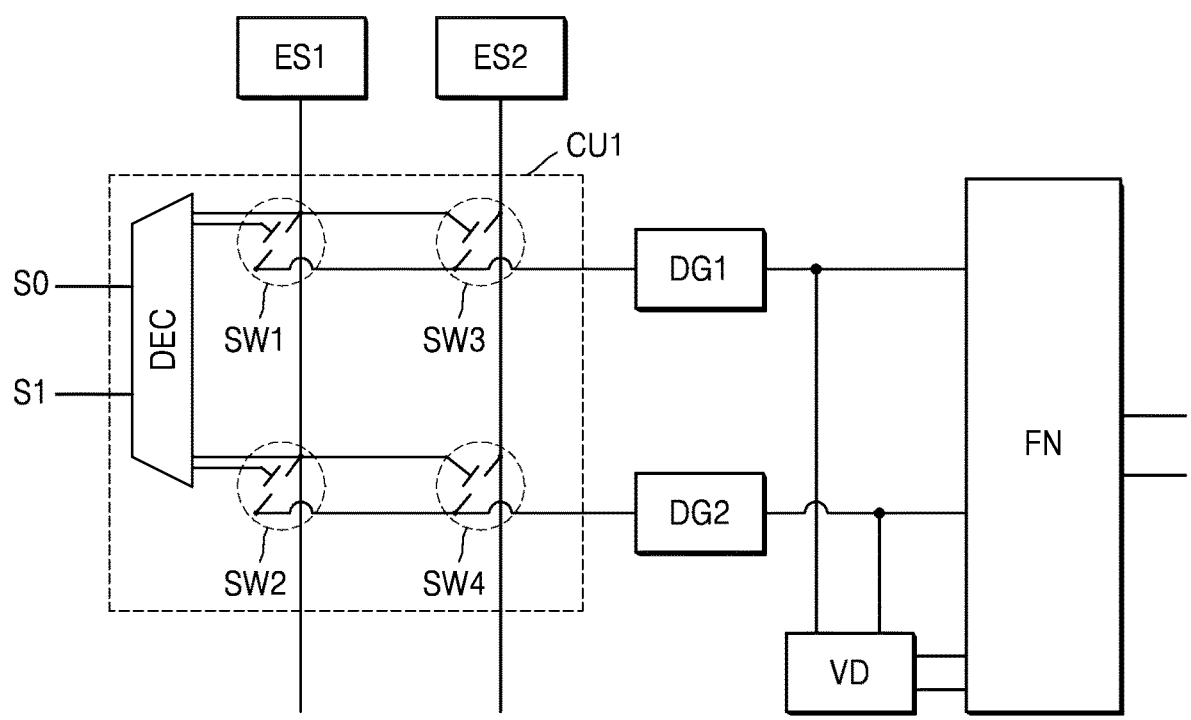
FIG. 12 is a block diagram schematically illustrating another embodiment of a security device according to aspects of the inventive concept.

FIG. 12 is a block diagram schematically illustrating another embodiment of a security device 100c according to aspects of the inventive concept. A security device 100c according to the embodiment of the inventive concept may be a modification of the security device 100b embodiment of FIG. 3. Redundant description of the embodiment will be omitted.

Referring to the embodiment of FIG. 12, the first combination unit CU1 may include a decoder DEC, a first switching device SW1, a second switching device SW2, a third switching device SW3, and a fourth switching device SW4.

The decoder DEC may be configured to generate first to fourth operation signals in response to the selection signals S0 and S1. For example, when logical values of the selection signals are (0, 0), (0, 1), (1, 0), and (1, 1), the first to fourth operation signals may be generated. The first to fourth operation signals are applied to the first to fourth switching devices SW1, SW2, SW3, and SW4, respectively.

The first switching device SW1 may be configured to connect the first entropy source ES1 and the first digitizer DG1 in response to the first operation signal. The second switching device SW2 may be configured to connect the first entropy source ES1 and the second digitizer DG2 in response to the second operation signal. The third switching device SW3 may be configured to connect the second entropy source ES2 and the first digitizer DG1 in response to the third operation signal. The fourth switching device SW4 may be configured to connect the second entropy source ES2 and the second digitizer DG2 in response to the fourth operation signal.

As illustrated in the embodiment of FIG. 12, the two entropy sources and the two digitizers are implemented so that 2*2=4 connection combinations may be obtained and four unit random number generating units may be implemented. Therefore, as described above, various combinations between the entropy sources and the digitizers may be obtained.

The first to fourth switching devices SW1, SW2, SW3, and SW4 used in the present embodiment may be implemented by passive devices for directly transmitting the analog random signals generated by the entropy sources to the digitizers. When the switching devices are implemented by active devices that have their own metastability level, it is not suitable for transmitting the analog random signals.

Therefore, switching devices according to the inventive concept may be formed in the way not to have their own metastability level. Examples in which the switching devices are implemented by the passive devices are exemplarily illustrated in the embodiments of FIGS. 13 to 15.

Figure 13:
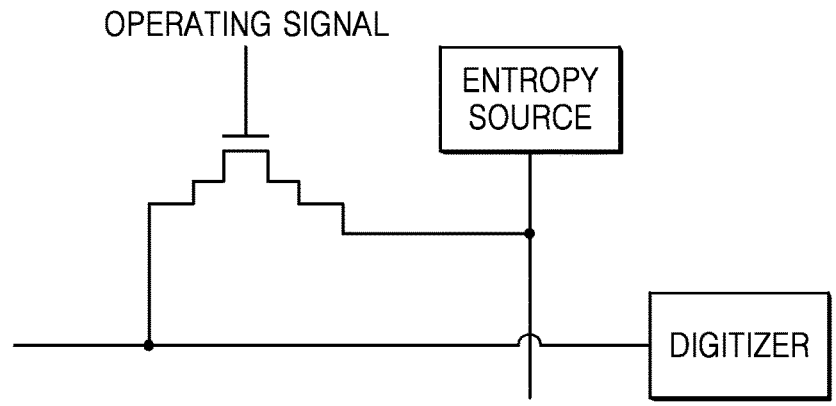
FIGS. 13 to 15 illustrate detailed exemplary embodiments of configurations of an element of a switching device.
Figure 14:
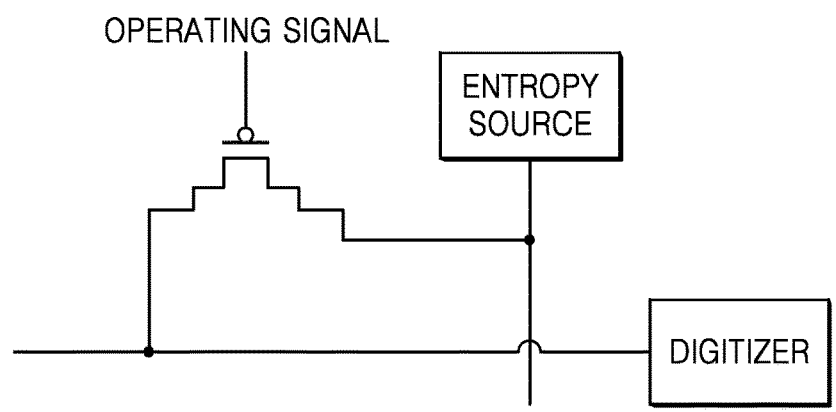
Figure 15:
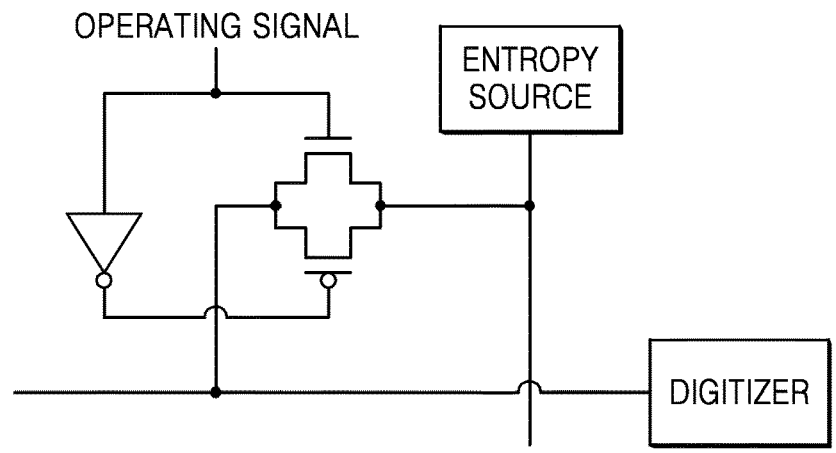

Referring to the embodiment of FIGS. 13 to 15, the switching device may be implemented as a p-type metal oxide semiconductor (PMOS) transistor, an n-type metal oxide semiconductor (NMOS) transistor, or a path-gate, respectively. In the path-gate of FIG. 15, when the operation signal generated by the decoder DEC is applied to a gate of the NMOS transistor, the NMOS transistor is turned on so that the entropy source and the digitizer connected to both ends of the NMOS transistor are electrically connected. In addition, the operation signal is inverted by the inverter and applied to a gate of the PMOS transistor. In this case, the PMOS transistor is turned on so that the entropy source and the digitizer connected to both ends of the PMOS transistor are electrically connected. In the NMOS transistor of FIG. 13 and the PMOS transistor of FIG. 14, the entropy source and the digitizer may be electrically connected by a similar principle to that of the path-gate of FIG. 15.

Figure 16:
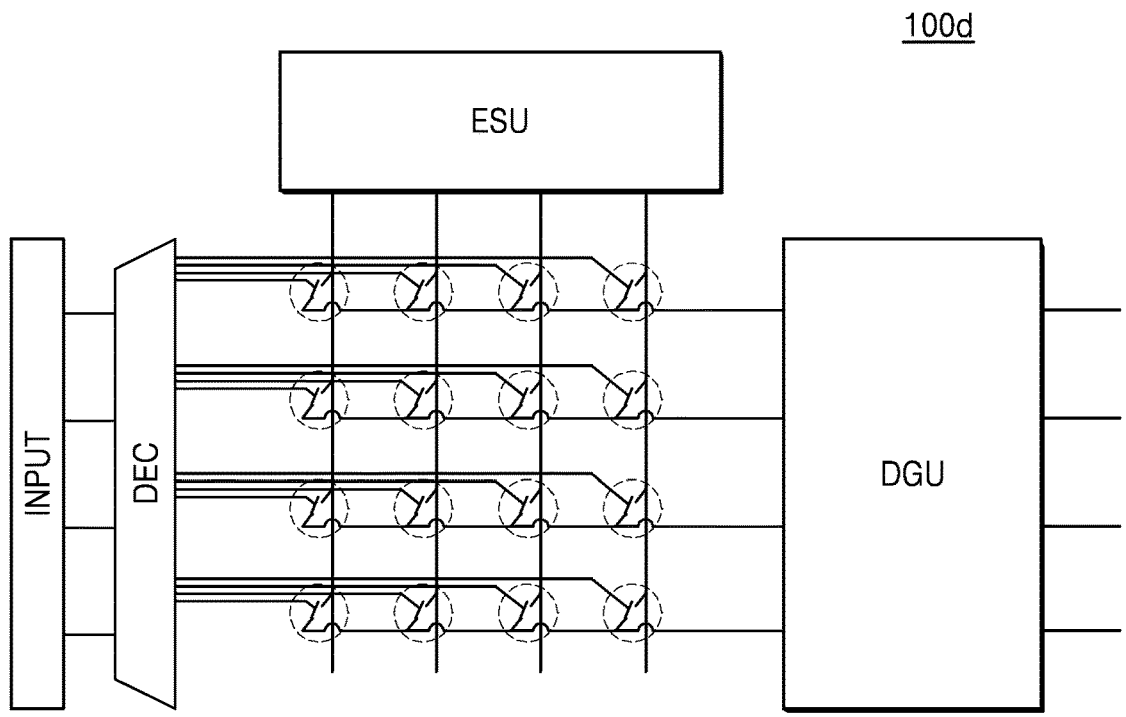
FIGS. 16 to 18 are block diagrams schematically illustrating embodiments of security devices according to aspects of the inventive concept.
Figure 17:
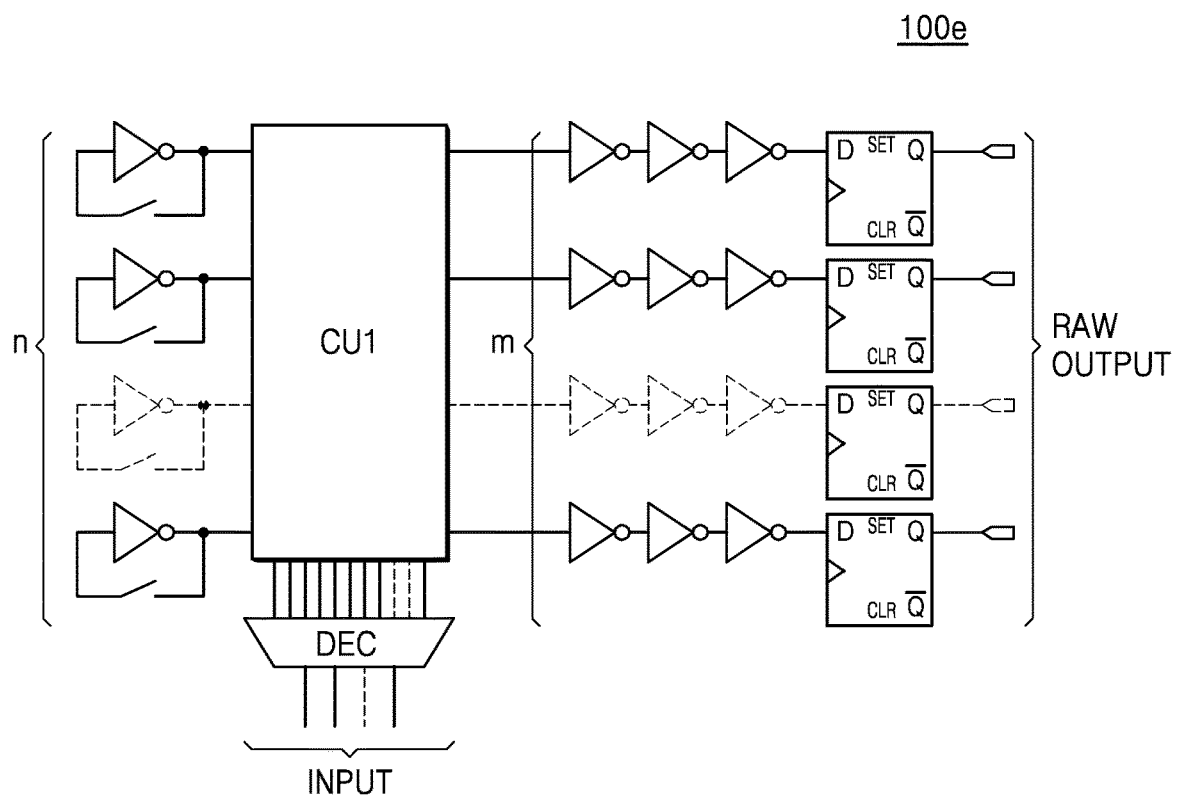
Figure 18:
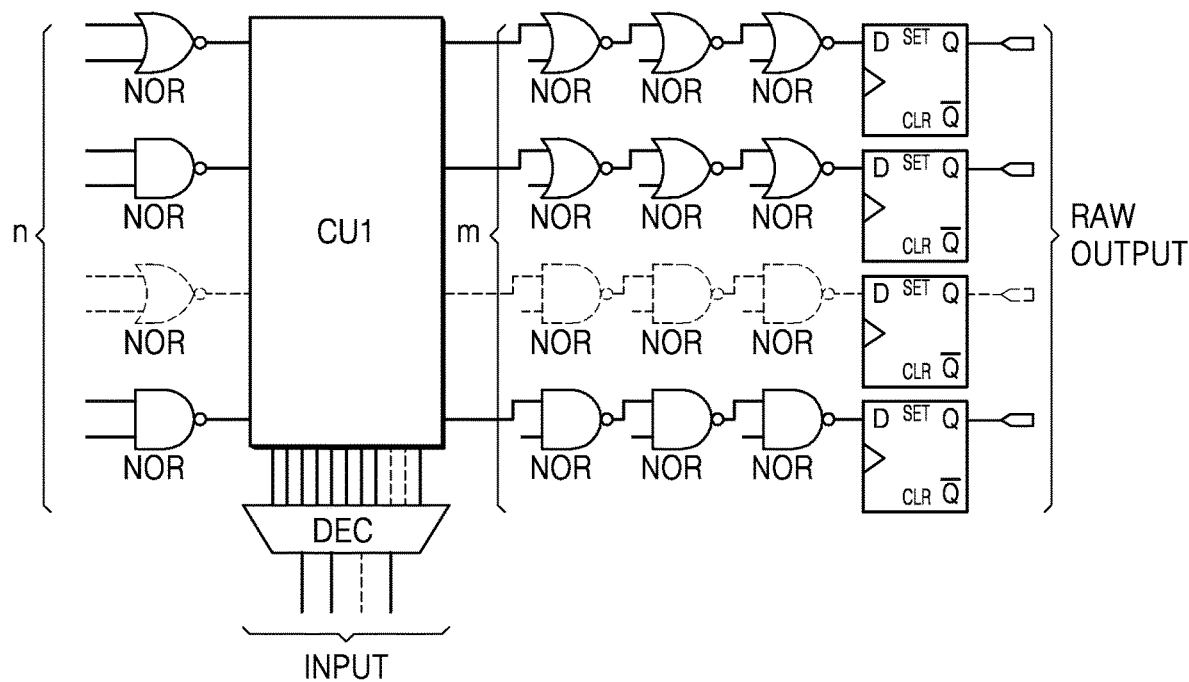

FIGS. 16 to 18 are block diagrams schematically illustrating other embodiments of security devices 100*d*, 100*e*, and 100*f* according to aspects of the inventive concept. Security devices 100*d*, 100*e*, and 100*f* according to the embodiments of the inventive concept may be modifications of the security device 100*c* according to the embodiment of FIG. 3. Redundant description of the embodiments will be omitted.

In the embodiment of FIG. 16, a configuration in which the entropy source unit ESU includes four entropy sources and the digitizing unit DGU includes four digitizers is illustrated. In the present embodiment, 4*4=16 connection combinations may be generated and 16 switching devices may be implemented to generate the 16 connection combinations.

The decoder DEC may generate operation signals for operating the 16 switching devices in response to selection signals of, for example, four bits. The selection signals may be generated by a selection signal generator (not shown). In the present embodiment, it is illustrated that the operation signals of the switching devices are output through the decoder DEC. However, the operation signals may be directly output from the selection signal generator to be applied to the switching devices.

Referring to the embodiments of FIGS. 17 and 18, the security devices 100*e* and 100*f* may include n entropy sources and m digitizers. In this case, n*m connection combinations may be obtained. The entropy sources and the digitizers may be implemented by inverters as illustrated in the embodiment of FIG. 17 or elements other than the inverters, such as NAND gates and NOR gates as illustrated in the embodiment of FIG. 18.

In addition, the digitizer may include a storage unit, such as a non-transitory memory storage device or media. The storage unit may be configured to store analog random signals amplified by a plurality of inverting units in the digitizer as digital random signals. The plurality of digital random signals stored in the storage unit (for example, a D flip-flop) illustrated in FIGS. 17 and 18 may be output in response to a clock signal and the output digital random signals may be filtered through the validity detecting unit and the finalizer. As a result of the filtering, a PUF output signal having a time-invariant characteristic may be generated.

Figure 19:
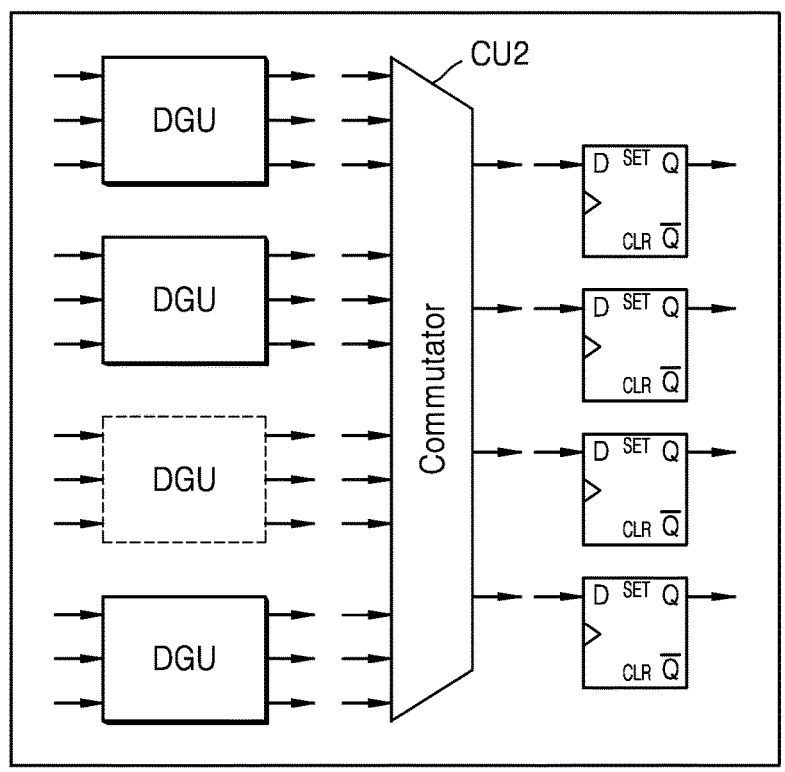
FIG. 19 is a block diagram schematically illustrating an embodiment of a security device according to an embodiment of the inventive concept.

FIG. 19 is a block diagram schematically illustrating an embodiment of a security device 100*g* according to aspects of the inventive concept.

Referring to the embodiment of FIG. 19, a security device 100*g* may further include a second combination unit CU2 connected between a plurality of digitizing units and a plurality of storage units. In the embodiments of FIGS. 17 and 18, configurations in which the digitizers and the storage units are connected in a ratio of one-to-one are illustrated. However, additional combination units may be included between the digitizers and the storage units (that is, a configuration in which the digitizers and the storage units are connected in a ratio of x to y) so that connection combinations between the digitizers and the storage units may be provided. Further, as illustrated in FIG. 19, additional combination units may be included between the digitizing units and the storage units (that is, a configuration in which the digitizing units and the storage units are connected in a ratio of x' to y') so that connection combinations between the digitizing units and the storage units may be provided.

In the security device described with reference to the embodiments of FIGS. 1 to 19, the entropy source unit ESU, the first combination unit CU1, and the second combination unit CU2 may form a basic PUF cell and the storage unit may be omitted from the basic PUF cell. The digital random signal output from the basic PUF cell may be selectively transmitted to the storage unit by the second combination unit CU2.

Through the configuration according to the embodiment of FIG. 19, an optimal random signal may be generated while minimizing the implementation areas of the combination unit and the storage unit. Although not shown, the validity detecting unit (VD) and the finalizer FN in the security device described with reference to FIGS. 1 to 19 may be connected between the PUF cell and the second combination unit CU2 or between the second combination unit CU2 and the storage unit.

Figure 20:
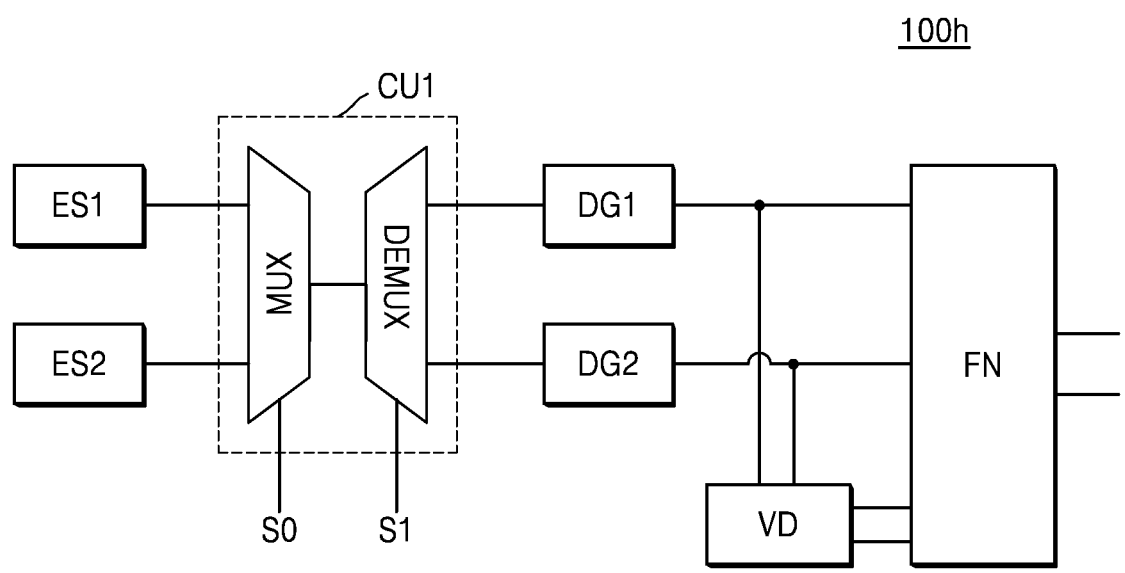
FIG. 20 is a block diagram schematically illustrating another embodiment of a security device according to aspects of the inventive concept.

FIG. 20 is a block diagram schematically illustrating another embodiment of a security device 100*h* according to aspects of the inventive concept. A security device 100*h* according to the embodiment may be a modification of the security device 100*c* according to the embodiment of FIG. 12. Redundant description of the embodiment will be omitted.

Referring to the embodiment of FIG. 20, a first combination unit CU1 in a security device 100*h* may include a multiplexer MUX configured to transmit a first analog random signal or a second analog random signal to an output port in response to a first selection signal S0. In addition, the first combination unit CU1 may include a demultiplexer DEMUX configured to receive the signal received to the output port and to transmit the signal to a first digitizer DG1 or a second digitizer DG2 in response to a second selection signal S1.

Here, the multiplexer MUX and the demultiplexer DEMUX may be implemented by passive devices. Therefore, an analog random signal generated by an entropy source may be directly transmitted to a digitizer without corruption of its metastability level.

Figure 21:
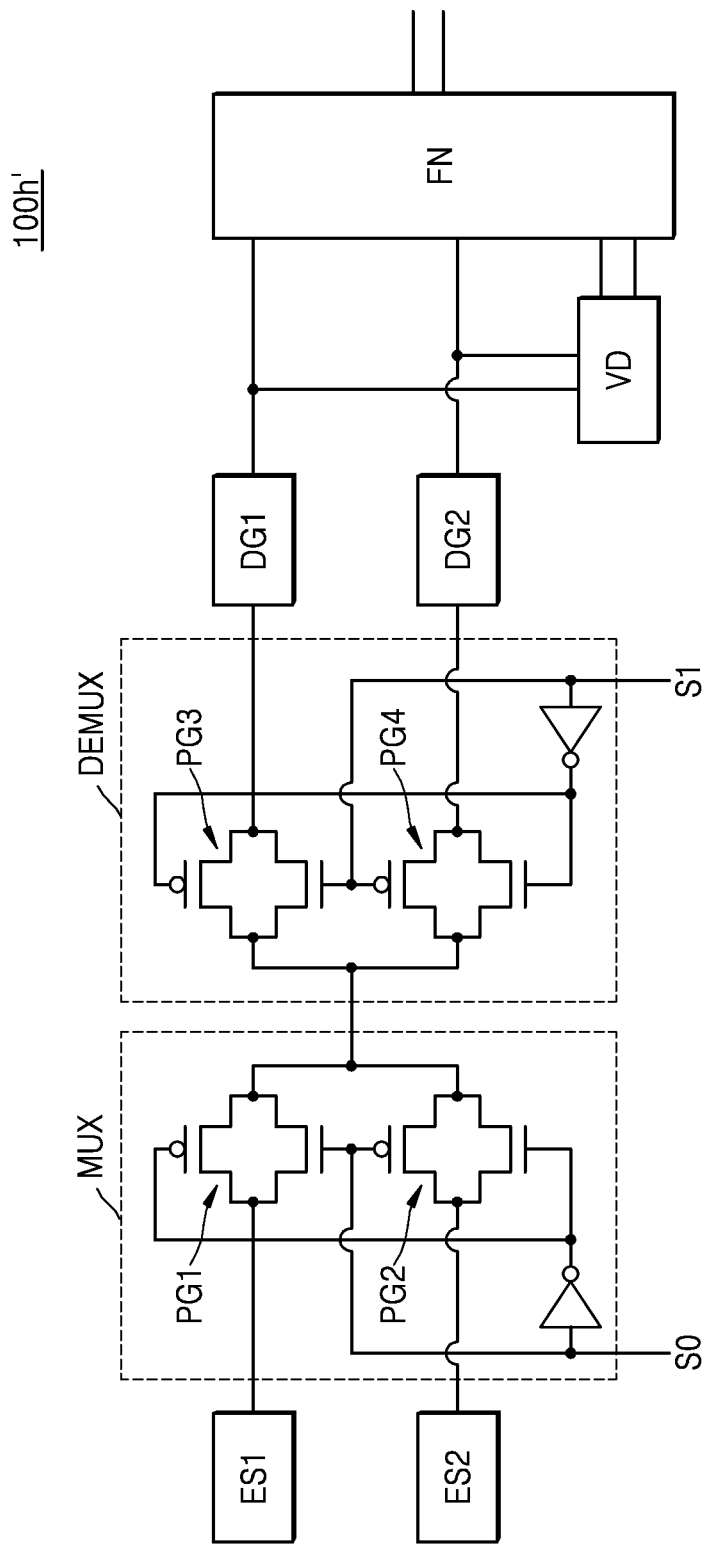
FIG. 21 illustrates an example embodiments of a multiplexer and a de-multiplexer implemented by a passive devices.

An example of the multiplexer MUX and the demultiplexer DEMUX implemented by the passive devices is illustrated in FIG. 21. Referring to the embodiment of FIG. 21, the multiplexer MUX may include a first path-gate PG1 configured to be turned on by the first selection signal S0 in a first state to transmit the first analog random signal and a second path-gate PG2 configured to be turned on by the first selection signal S0 in a second state to transmit the second analog random signal.

In addition, the demultiplexer DEMUX may include a third path-gate PG3 configured to be turned on by the second selection signal S1 in a first state to transmit an input analog random signal to the first digitizer DG1 and a fourth path-gate PG4 configured to be turned on by the second selection signal S1 in a second state to transmit an input analog random signal to the second digitizer DG2.

Although a path-gate configuration is illustrated in the embodiment of FIG. 21 as an example of forming the multiplexer MUX and the demultiplexer DEMUX, it will be understood that the multiplexer MUX and the demultiplexer DEMUX may be implemented by other types of passive devices, such as NMOS switches or PMOS switches, instead of the path-gate configuration.

Figure 22:
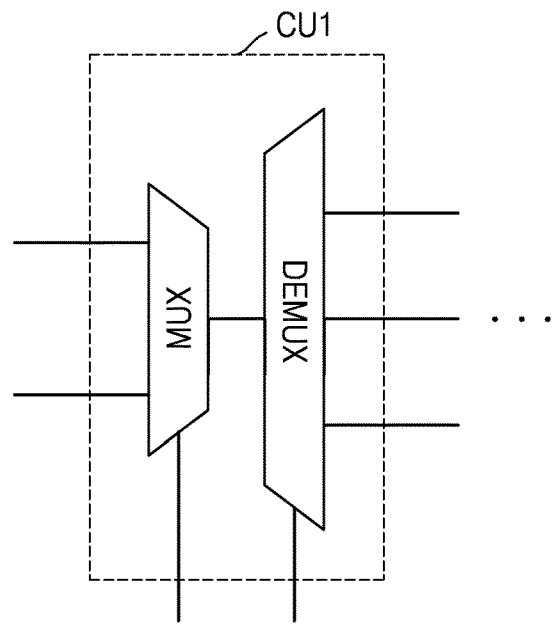
FIGS. 22 to 24 illustrate example embodiments in which a first combination unit is implemented by multiplexers and/or de-multiplexers.
Figure 23:
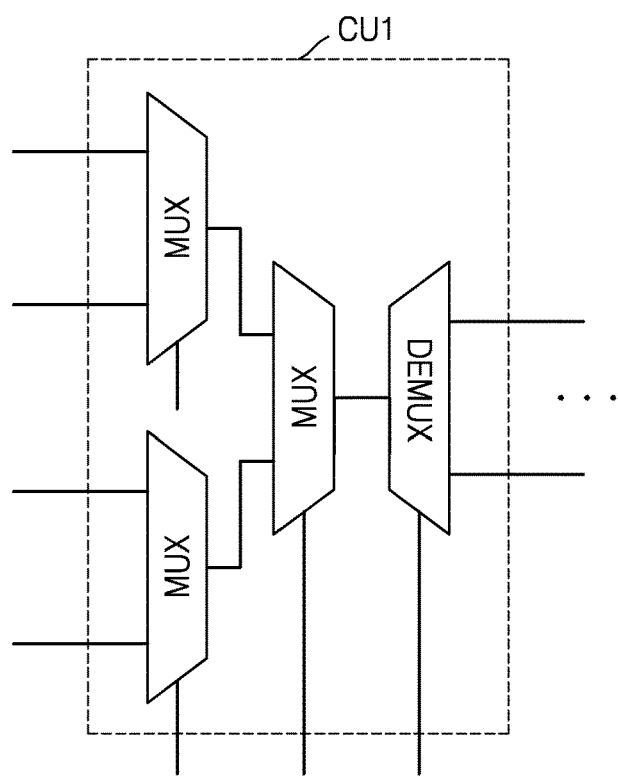
Figure 24:
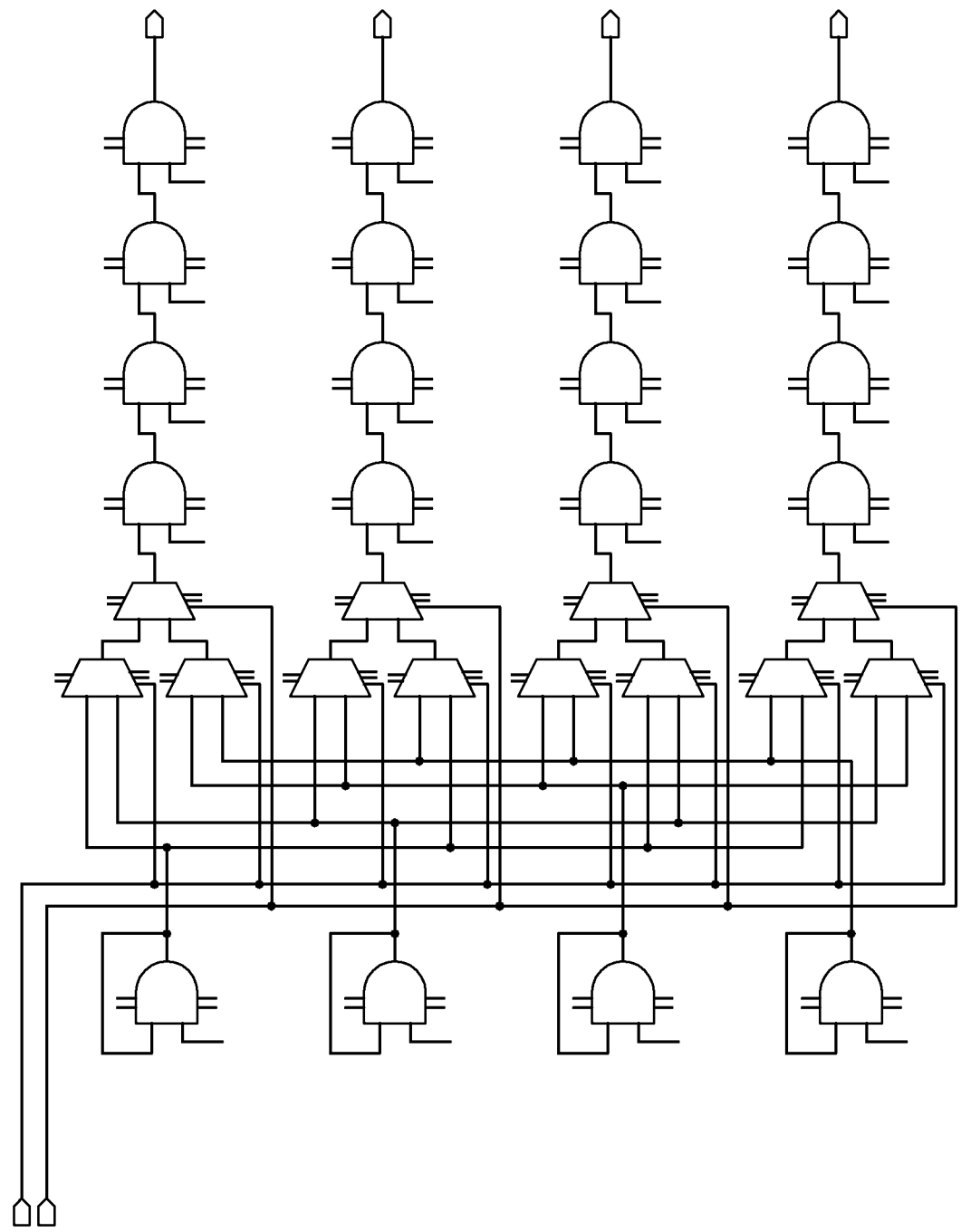

FIGS. 22 to 24 illustrate various example embodiments in which a first combination unit CU1 is implemented by multiplexers MUX and/or demultiplexers DEMUX.

Referring to the embodiment of FIG. 22, a first combination unit CU1 may include one multiplexer MUX and one demultiplexer DEMUX. Like in the embodiment illustrated in FIG. 21, one of a plurality of analog random signals is selected through the multiplexer MUX and the selected analog random signal may be transmitted to one of a plurality of digitizers through the demultiplexer DEMUX.

Referring to the embodiment of FIG. 23, the first combination unit CU1 may include a plurality of multiplexers MUX and one demultiplexer DEMUX. That is, the plurality of multiplexers MUX are arranged through a number of operations so that one analog random signal may be selected through the multiplexers MUX to be transmitted to the demultiplexer DEMUX. The selected analog random signal may be transmitted to one of a plurality of digitizers through the demultiplexer DEMUX.

FIG. 24 illustrates an example in which a first combination unit is implemented by only a plurality of multiplexers. For example, a first combination unit may include a group consisting of a plurality of multiplexers and the group may be provided to correspond to the number of digitizers. In addition, the number of multiplexers in the group may be proportional to the number of entropy sources.

For example, when it is assumed that x entropy source and y digitizers are provided and the first combination unit is formed of only a multiplexer having only two input terminals, the number of multiplexer groups may be y and the number of multiplexers in the group may be x−1. Therefore, (x−1)*y multiplexers are provided.

Since four entropy sources and four digitizers are provided in the embodiment illustrated in FIG. 24, the first combination unit may include four (4) multiplexer groups of the same number as that (that is, four) of the digitizer groups. In addition, the number of multiplexers in the group is 3, which is obtained by subtracting one from the number of entropy sources. Therefore, 12 multiplexers are provided.

Figure 25:
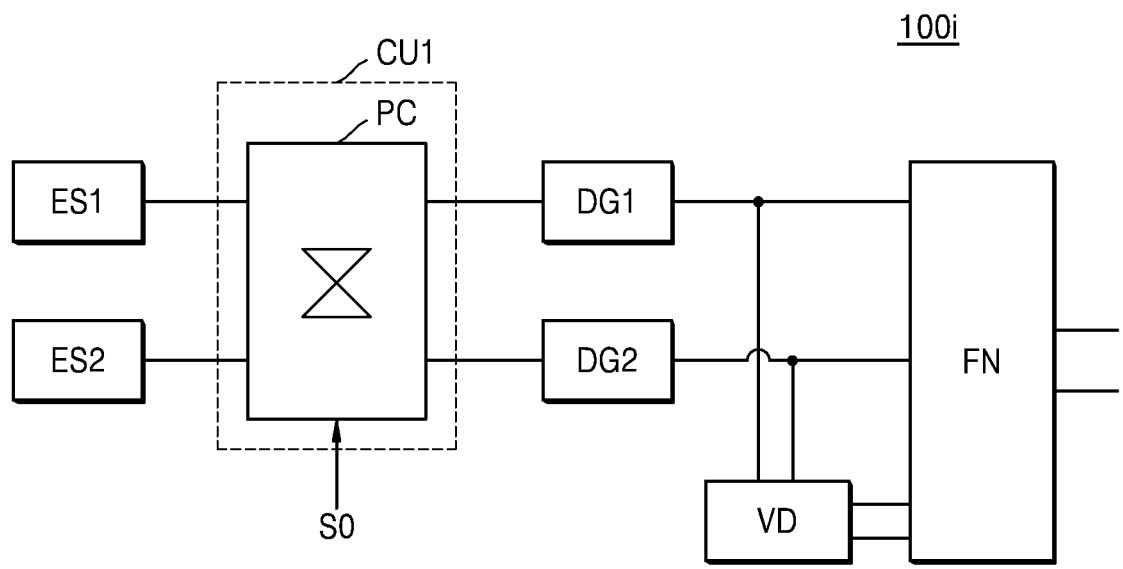
FIG. 25 is a block diagram schematically illustrating another embodiment of a security device according to aspects of the inventive concept.

FIG. 25 is a block diagram schematically illustrating another embodiment of a security device 100i according to aspects of the inventive concept. A security device 100i according to the embodiment may be a modification of the security device 100c according to the embodiment of FIG. 12. Redundant description of the embodiment will be omitted.

Referring to the embodiment of FIG. 25, a first combination unit CU1 may include a passive crossbar PC configured to transmit a first analog random signal of a first entropy source unit ES1 and a second analog random signal of a second entropy source unit ES2 to a first digitizer DG1 and a second digitizer DG2 in response to a selection signal (for example, a signal S0 of one bit), where the transmission from ES1 and ES2 to DG1 and DG2 or to DG2 and DG1 depends on the logical state of S0. The passive crossbar PC may include a multiplexer MUX for selecting one of analog random signals input to two input terminals in response to the selection signal. The multiplexer MUX may be implemented by a passive device as described above.

Figure 26:
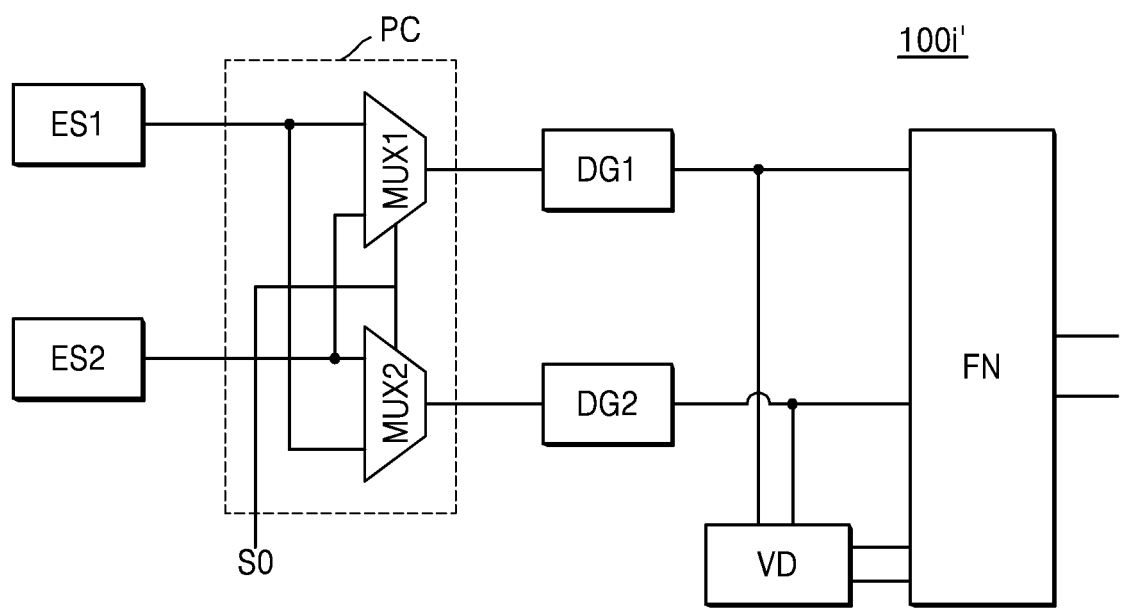
FIG. 26 illustrates an exemplary embodiment of a configuration of a passive crossbar.

A detailed exemplary configuration of the passive crossbar PC is illustrated in FIG. 26. Referring to the embodiment of FIG. 26, the passive crossbar PC may include a first multiplexer MUX1 and a second multiplexer MUX2. A first input terminal of the first multiplexer MUX1 may be connected to the first entropy source ES1, a second input terminal of the first multiplexer MUX1 may be connected to the second entropy source ES2, and an output terminal of the first multiplexer MUX1 may be connected to the first digitizer DG1. In addition, a first input terminal of the second multiplexer MUX2 may be connected to the second entropy source ES2, a second input terminal of the second multiplexer MUX2 may be connected to the first entropy source ES1, and an output terminal of the second multiplexer MUX2 may be connected to the second digitizer DG2.

The first multiplexer MUX1 and the second multiplexer MUX2 may select one of the signals input in response to the selection signal S0 of one bit. For example, when the selection signal S0 is in a first state (for example, S0=0), the first multiplexer MUX1 may select the first analog random signal of the first entropy source ES1 and may transmit the first analog random signal of the first entropy source ES1 to the first digitizer DG1. At the same time, the second multiplexer MUX2 may select the second analog random signal of the second entropy source ES2 and may transmit the second analog random signal of the second entropy source ES2 to the second digitizer DG2.

When the selection signal S0 is in a second state (for example, S0=1), the first multiplexer MUX1 may select the second analog random signal of the second entropy source ES2 and may transmit the second analog random signal of the second entropy source ES2 to the first digitizer DG1. At the same time, the second multiplexer MUX2 may select the first analog random signal of the first entropy source ES1 and may transmit the first analog random signal of the first entropy source ES1 to the second digitizer DG2.

When the multiplexers MUX in the passive crossbar PC are implemented by passive devices, the passive crossbar PC may include a first passive device, a second passive device, a third passive device, and a fourth passive device.

For example, the first passive device may be configured to be turned on by the selection signal in the first state (for example, S0=0) to transmit the first analog random signal to the first digitizer DG1. The second passive device may be configured to be turned on by the selection signal in the first state (for example, S0=0) to transmit the second analog random signal to the second digitizer DG2. For example, each MUX (MUX1 and MUX2) could comprise at least 2 path-gates PG, as in the MUX of FIG. 21.

The third passive device may be configured to be turned on by the selection signal in the second state (for example, S0=1) to transmit the first analog random signal to the second digitizer DG2. The fourth passive device may be configured to be turned on by the selection signal in the second state (for example, S0=1) to transmit the second analog random signal to the first digitizer DG1.

In such a configuration (that is, the first to fourth passive devices), the first and third passive devices may be included in the first multiplexer MUX1 and the second and fourth passive devices may be included in the second multiplexer MUX2.

Figure 27:
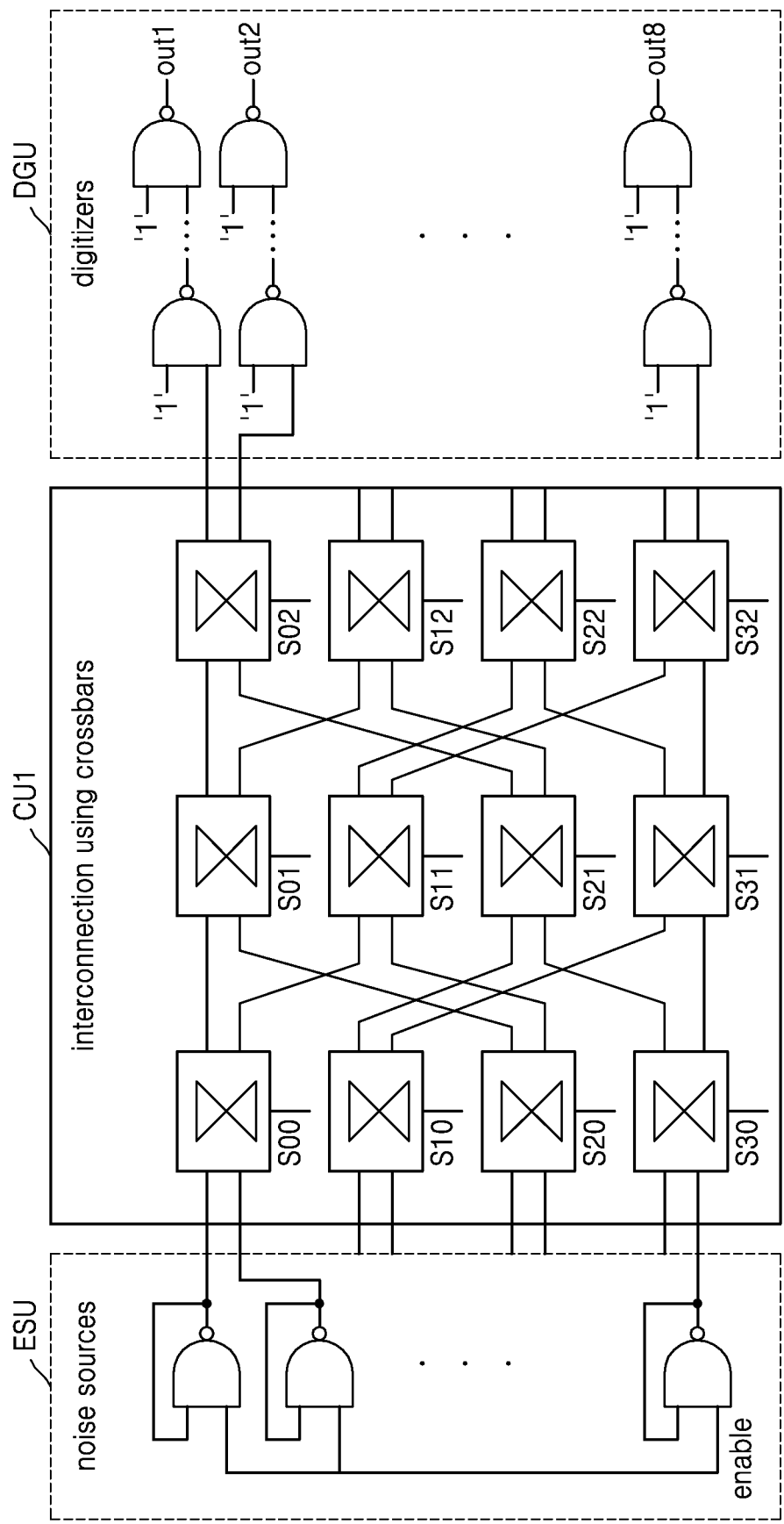
FIG. 27 illustrates an embodiment of a generalized configuration of the first combination unit illustrated in FIG. 25.

A generalized configuration of the first combination unit CU1 illustrated in FIG. 25 is illustrated in FIG. 27. Referring to the embodiment of FIG. 27, the first combination unit CU1 may be implemented by a plurality of passive crossbars. For example, in order to implement the first combination unit CU1 for connecting eight entropy sources in ESU and eight digitizers in DGU, 12 passive crossbars (S00 to S32) may be used. Such a configuration requires that selection signals of a plurality of bits be provided, however, CU1 has an advantage in that the entropy sources and the digitizers may be connected by a fastest route. That is, it is possible to minimize the number of multiplexers between the entropy sources of ESU and the digitizers of DGU.

Figure 28:
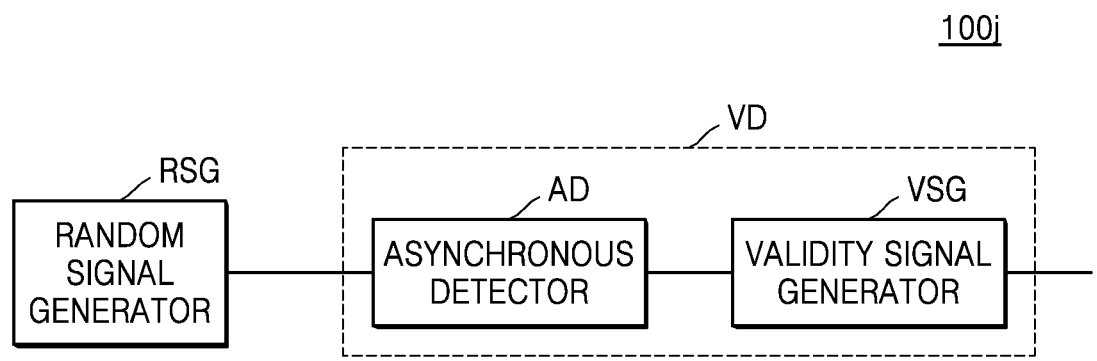
FIG. 28 is a block diagram schematically illustrating an embodiment of a security device according to aspects of the inventive concept.

FIG. 28 is a block diagram schematically illustrating an embodiment of a security device 100j according to aspects of the inventive concept.

Referring to FIG. 28, a security device 100j may include a random signal generator RSG and a validity detecting unit VD. The random signal generator RSG may be configured to generate a digital random signal. For example, the random signal generator RSG may include at least one of an SRAM PUF, a ring oscillator PUF, a butterfly PUF, a flip-flop PUF, and an arbiter PUF. In addition, the random signal generator RSG may include the configurations (for example, the entropy source unit, the first combination unit, and the digitizing unit) illustrated and described in the above-described embodiments. Hereinafter, redundant description of the embodiment will be omitted.

The validity detecting unit VD may be configured to asynchronously detect transition of a digital random signal to detect validity (for example, a time-invariant characteristic) of the digital random signal. For this purpose, the validity detecting unit VD may include an asynchronous detector AD and a validity signal generator VSG.

The asynchronous detector AD may be configured to detect transition of the digital random signal from a first state (for example, a low state or a logic '0') to a second state (for example, a high state or a logic '1') and transition of the digital random signal from the second state (for example, the high state or the logic '1') to the first state (for example, the low state or the logic '0').

The validity signal generator VSG may be configured to generate a validity signal in response to an output signal of the asynchronous detector AD. To be specific, the asynchronous detector AD may detect an edge or glitch of the digital random signal to generate the output signal and the validity signal generator VSG may generate the validity signal in response to a change in the output signal, i.e., a change in logic level of the output signal.

Figure 29:
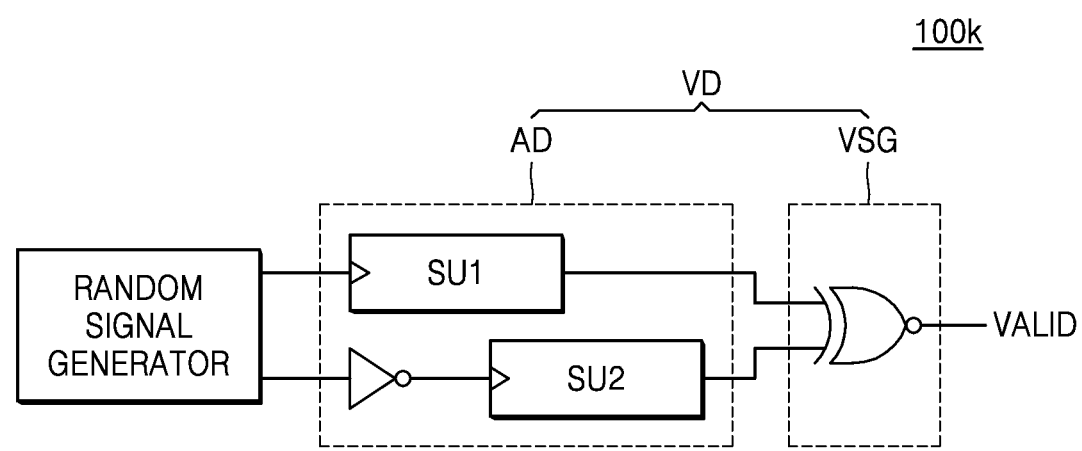
FIGS. 29 and 30 illustrate exemplary embodiments of a validity detecting unit.
Figure 30:
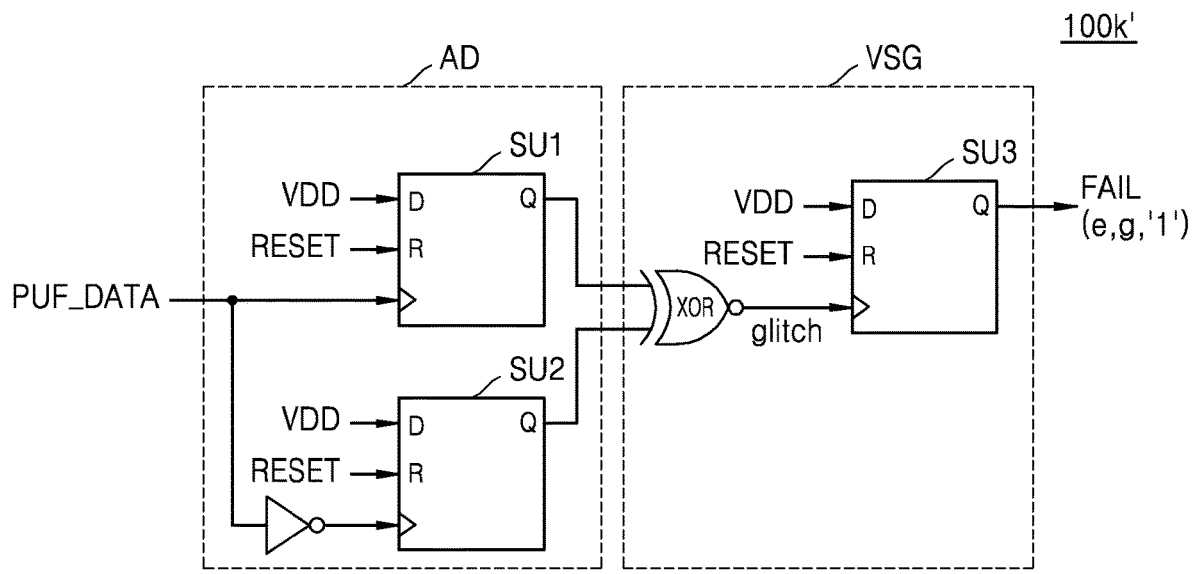

An exemplary embodiment of the validity detecting unit VD is illustrated and described in security devices 100k and 100k' of FIGS. 29 and 30 in detail. Referring to FIGS. 29 and 30, the asynchronous detector AD may include a first storage unit SU1 and a second storage unit SU2 and the validity signal generator VSG may include an XOR gate.

The first storage unit SU1 may be configured to receive the digital random signal as a first clock signal and to output data in response to the first clock signal. To be specific, when a transition signal of the digital random signal from the first state (for example, the low state or the logic '0') to the second state (for example, the high state or the logic '1') is applied to a clock signal input terminal of the first storage unit SU1, the first storage unit SU1 may output stored data.

The second storage unit SU2 may be configured to receive a clock signal obtained by inverting the digital random signal and to output data in response to the clock signal. For this purpose, the asynchronous detector AD may further include an inverting unit for inverting the digital random signal. When the transition of the digital random signal from the second state (for example, the low state or the logic '1') to the first state (for example, the high state or the logic '0') occurs, the transited signal may be inverted through the inverting unit to be applied to a clock signal input terminal of the second storage unit SU2. The second storage unit SU2 may output stored data.

The validity signal generator VSG may include the XOR gate and the XOR gate may include a first input terminal for receiving an output signal of the first storage unit SU1 and a second input terminal for receiving an output signal of the second storage unit SU2. The XOR gate may perform an XOR operation based on the output signals to output the operation result as validity signals.

The data stored in the first storage unit SU1 and the second storage unit SU2 represents whether the transition of the digital random signal occurs and may be the same data (for example, a VDD signal or a logic '1' signal).

When the transition of the digital random signal does not occur, for example, when the digital random signal is continuously maintained to be logic '0' or logic '1', the XOR gate may output a logic '0' signal.

When the transition of the digital random signal occurs, for example, when the digital random signal is transitioned from the logic '0' to the logic '1' or from the logic '1' to the logic '0', the XOR gate may output a logic '1' signal.

An embodiment of a detailed operation will be described with reference to FIG. 30. Referring to FIG. 30, a first storage unit SU1, a second storage unit SU2, and a third storage unit SU3 may be implemented by D flip-flops. When a reset signal RESET is logic '1', outputs of the first storage unit SU1 and the second storage unit SU2 are logic '0' so that an output of an XOR gate is also logic '0'. Therefore, an output signal FAIL (that is, an output signal of the third storage unit SU3) that represents whether a signal is valid is also maintained to be logic '0'.

When the reset signal RESET is logic '0', the first storage unit SU1 and the second storage unit SU2 perform detecting operations. For example, when transition of a digital random signal PUF_DATA from '0' to '1' occurs, the output of the first storage unit SU1 is logic '1' so that the output of the XOR gate provides a transition signal from the logic '0' to the logic '1' to the third storage unit SU3. As a result, the output signal FAIL (that is, the output signal of the D flip-flop) that represents whether a signal is valid is logic '1'. The output signal FAIL is maintained until the reset signal RESET is logic '1'.

In addition, for example, when transition of the digital random signal PUF_DATA from '1' to '0' occurs, the output of the second storage unit SU2 is logic '1' so that the output of the XOR gate provides the transition signal from the logic '0' to the logic '1' to the third storage unit SU3. As a result, the output signal FAIL (that is, the output signal of the D flip-flop) that represents whether a signal is valid is logic '1'. The output signal FAIL is maintained until the reset signal RESET is logic '1'.

Figure 31:
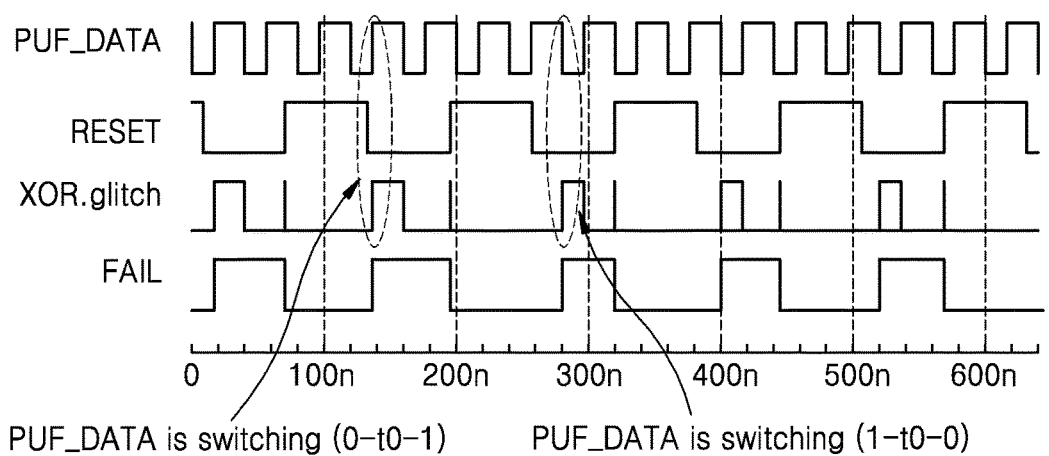
FIG. 31 is a timing diagram illustrating embodiments of signals of the security device of FIG. 30.

FIG. 31 is an embodiment of a timing diagram illustrating signals of the security device 100k' of FIG. 30. As illustrated in FIG. 31, it is noted that the security device according to the embodiment detects the transition (for example, the transition from '0' to '1' or the transition from '1' to '0') of the digital random signal PUF_DATA to generate the output signal FAIL (for example, logic '1') that represents whether a signal is valid while the reset signal RESET is logic '0'.

Figure 32:
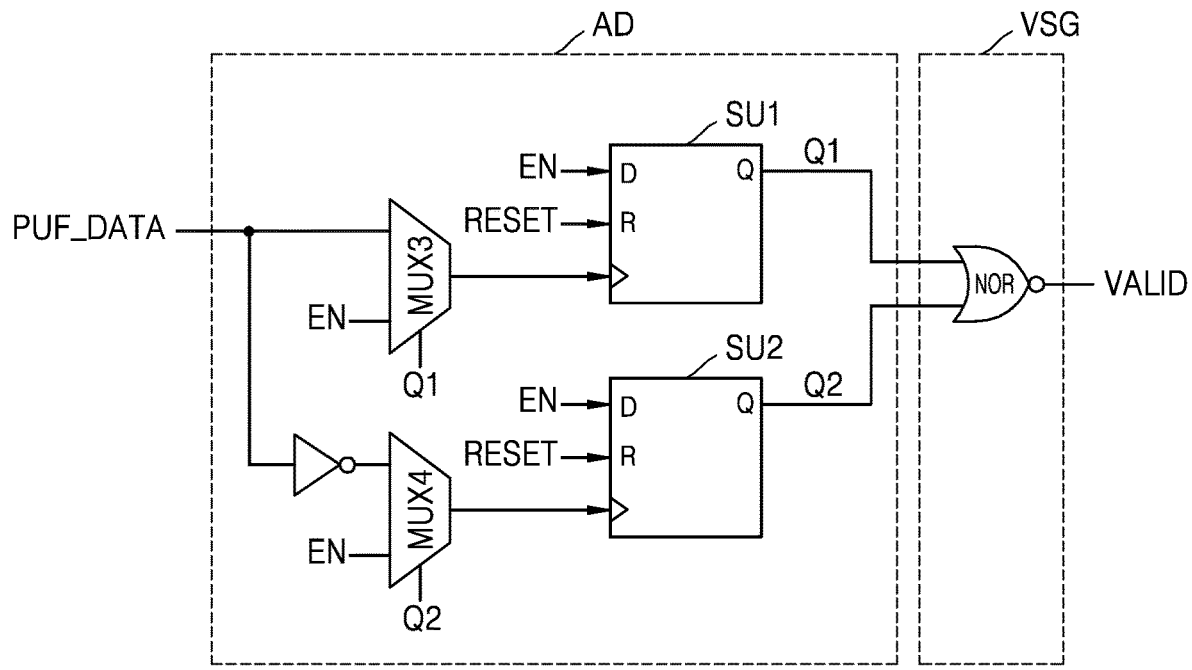
FIGS. 32 and 33 are a block diagram and a timing diagram schematically illustrating another embodiment of a security device according to aspects of the inventive concept.
Figure 33:
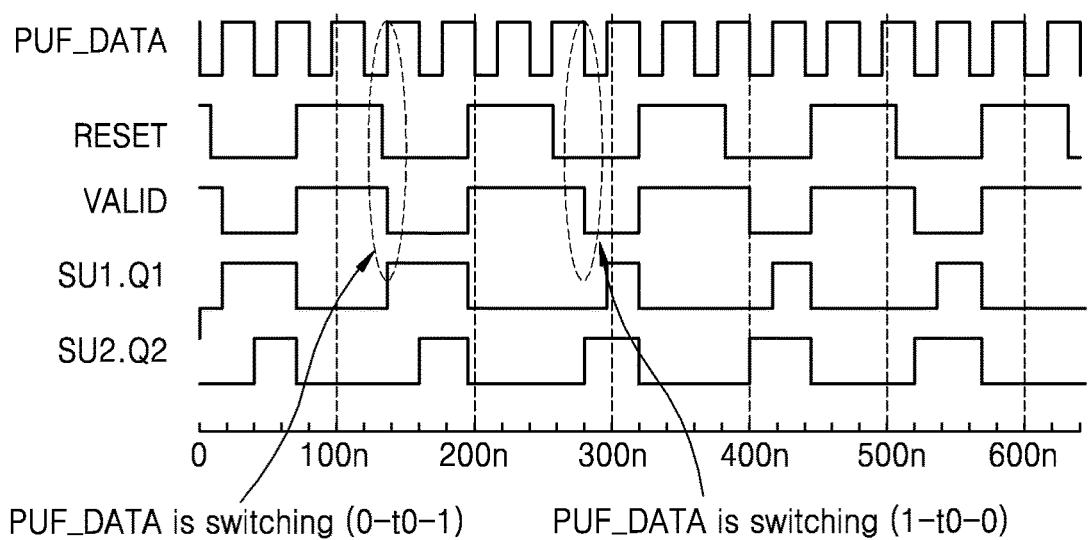

FIGS. 32 and 33 are other embodiments of a block diagram and a timing diagram, respectively, schematically illustrating a security device 100l according to aspects of the inventive concept. A security device 100l according to the embodiment may be a modification of the security device 100j according to the embodiment of FIG. 28. Hereinafter, redundant description of the embodiment will be omitted.

In the embodiment of FIGS. 30 and 31, the output signal FAIL that represents whether a signal is valid is 0. However, in the embodiment of FIGS. 32 and 33, an output signal VALID that represents whether a signal is valid is '1'. That is, the output signal FAIL in a normal state is maintained as '0' in FIGS. 30 and 31 and the output signal VALID in a normal state is maintained as 1 in FIGS. 32 and 33.

Referring to the embodiment of FIG. 32, an asynchronous detector AD may include a first storage unit SU1 and a second storage unit SU2. The first storage unit SU1 and the second storage unit SU2 have similar functions to those of the first storage unit SU1 and the second storage unit SU2 of FIG. 30 in that the first storage unit SU1 and the second storage unit SU2 receive a digital random signal as a clock signal to detect transition of the digital random signal.

The asynchronous detector AD may further include a third multiplexer MUX3 and a fourth multiplexer MUX4. A first input terminal of the third multiplexer MUX3 may receive a digital random signal PUF_DATA and a second input terminal of the third multiplexer MUX3 may receive an enable signal EN (for example, a logic '1' signal). The third multiplexer MUX3 may receive an output signal Q1 of the first storage unit SU1 as a selection signal and an output signal of the third multiplexer MUX3 may be applied to a clock signal input terminal of the first storage unit SU1.

A first input terminal of the fourth multiplexer MUX4 may receive a signal obtained by inverting the digital random signal PUF_DATA and a second input terminal of the fourth multiplexer MUX4 may receive the enable signal EN (or the logic '1' signal). The fourth multiplexer MUX4 may receive an output signal Q2 of the second storage unit SU2 as a selection signal and an output signal of the fourth multiplexer MUX4 may be applied to a clock signal input terminal of the second storage unit SU2.

A validity signal generator VSG may include a NOR gate. A first input terminal of the NOR gate may receive the output signal of the first output unit SU1 and a second input terminal of the NOR gate may receive the output signal of the second storage unit SU2. Therefore, when the output signal of the third multiplexer MUX3 is transited, a logic '1' is applied to the first input terminal and, when the output signal of the fourth multiplexer MUX4 is transited, a logic '1' is applied to the second input terminal.

When a reset signal RESET is logic '1', outputs of the first storage unit SU1 and the second storage unit SU2 are logic '0' so that an output of a NOR gate is logic '1'. Therefore, an output signal VALID (that is, an output signal of the NOR gate) that represents whether a signal is valid is maintained as 1.

When the reset signal RESET is logic '0', the first storage unit SU1 and the second storage unit SU2 perform detecting operations. For example, when transition of the digital random signal PUF_DATA from '0' to '1' occurs, the first storage unit SU1 is logic '1' so that an output signal VALID (that is, the output signal of the NOR gate) that represents whether a signal is valid is maintained to be logic '0'. Since an output signal Q1 of the first storage unit SU1 is logic '1', the selection signal Q1 of the third multiplexer MUX3 is logic '1' so that the third multiplexer MUX3 may transmit the signal EN (for example, logic '1') of the second input terminal to the first storage unit SU1. Therefore, the first storage unit SU1 continuously outputs the logic '1' signal so that the output signal VALID is continuously maintained to be logic '0' until the reset signal RESET is logic '1'.

In addition, when transition of the digital random signal PUF_DATA from '1' to '0' occurs, the second storage unit SU2 is logic '1' so that the output signal VALID (that is, the output signal of the NOR gate) that represents whether a signal is valid is 0. Since the output signal Q2 of the second storage unit SU2 is logic '1', the selection signal Q2 of the fourth multiplexer MUX4 is logic '1' so that the fourth multiplexer MUX4 may transmit the signal EN (for example, logic '1') of the second input terminal to the second storage unit SU2. Therefore, the second storage unit SU2 continuously outputs the logic '1' signal so that the output signal VALID is continuously maintained to be logic '0' until the reset signal RESET is logic '1'.

FIG. 33 is an embodiment of a timing diagram illustrating signals of the security device 100*l* of FIG. 32. As illustrated in FIG. 33, it is noted that the security device 100*l* according to the embodiment detects the transition (for example, the transition from '0' to '1' or the transition from '1' to '0') of the digital random signal to generate the output signal (for example, logic '0') that represents whether a signal is valid while the reset signal RESET is logic '0'.

The validity detecting unit of the security device 100*l* according to the embodiment may be implemented by only two storage units. Therefore, the implementation area of the validity detecting unit of the security device 100*l* may be smaller than that of the validity detecting unit of the security device 100*k'* that requires three storage units according to the embodiment of FIG. 30.

Figure 34:
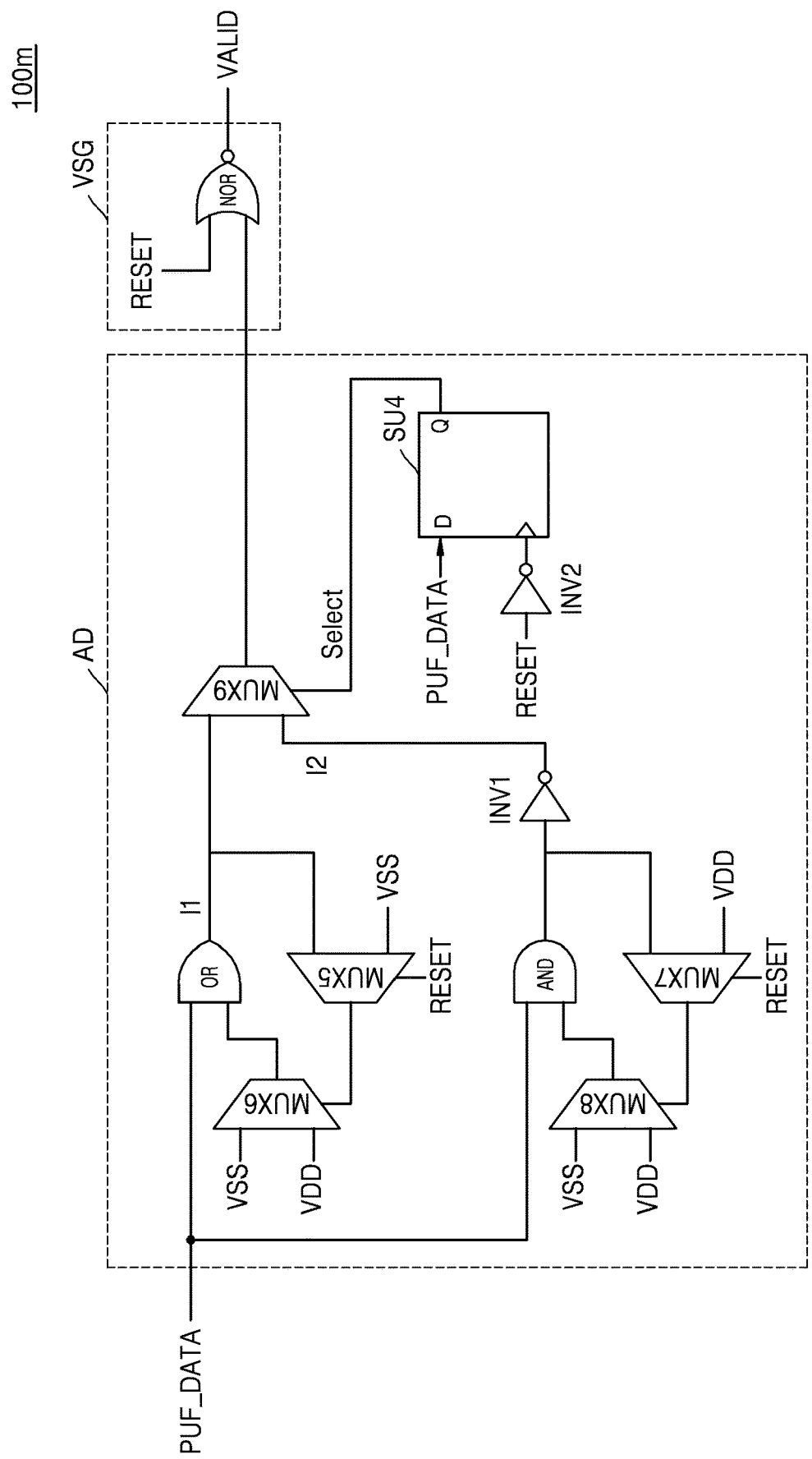
FIGS. 34 and 35 are a block diagram and a timing diagram schematically illustrating embodiments of security devices according to aspects of the inventive concept.
Figure 35:
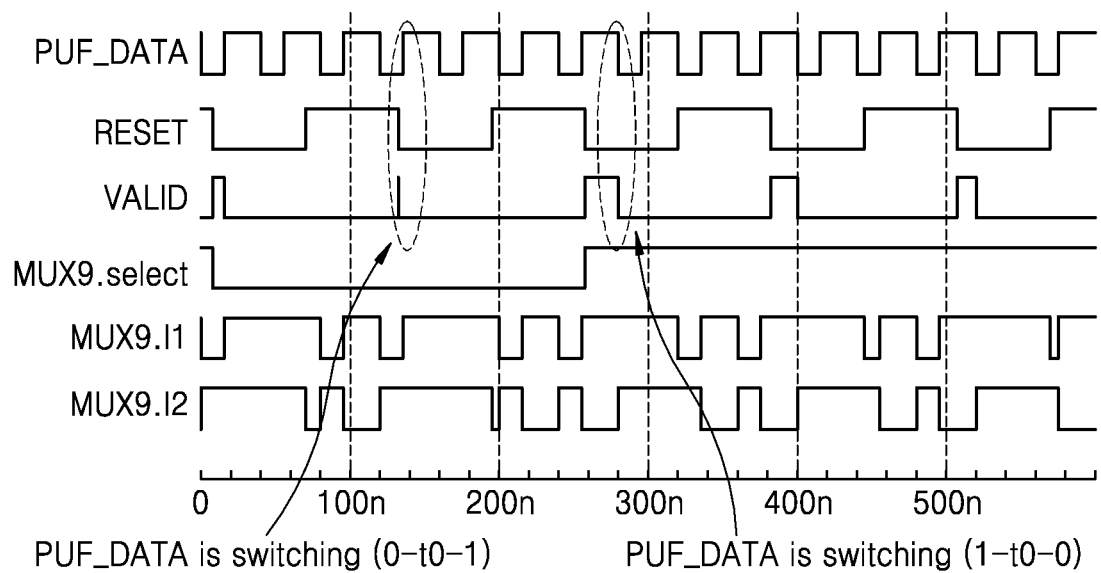

FIGS. 34 and 35 are a block diagram and a timing diagram schematically illustrating another embodiment of a security device according to aspects of the inventive concept. A security device 100*m* according to the embodiment may be a modification of the security device 100*j* according to the embodiment of FIG. 28. Redundant description of the embodiment will be omitted.

Referring to the embodiment of FIG. 34, an asynchronous detector AD may include an OR gate and an AND gate. A first input terminal of the OR gate may receive a digital random signal PUF_DATA and a second input terminal of the OR gate may receive an output signal of the OR gate, via a fifth multiplexer MUX5 and a sixth multiplexer MUX 6. Likewise, a first input terminal of the AND gate may receive a digital random signal PUF_DATA and a second input terminal of the AND gate may receive an output signal of the AND gate, via a seventh multiplexer MUX7 and an eighth multiplexer MUX 8.

The fifth multiplexer MUX5 and the sixth multiplexer MUX6 may be connected together to form a feedback route or path of the OR gate output signal. The output signal of the OR gate is applied to a first input terminal of the fifth multiplexer MUX5 and a logic '0' signal may be applied to a second input terminal of the fifth multiplexer MUX5. A reset signal RESET may be applied to a selection signal input terminal of the fifth multiplexer MUX5. A logic '0' signal may be applied to a first input terminal of the sixth multiplexer MUX6 and a logic '1' signal may be applied to a second input terminal of the sixth multiplexer MUX6. An output signal of the fifth multiplexer MUX5 may be applied to a selection signal input terminal of the sixth multiplexer MUX6.

The seventh multiplexer MUX7 and the eighth multiplexer MUX8 may be connected together to form a feedback route or path of the AND gate output signal. The output signal of the AND gate may be applied to a first input terminal of the seventh multiplexer MUX7 and a logic '1' signal may be applied to a second input terminal of the seventh multiplexer MUX7. The reset signal RESET may be applied to a selection signal input terminal of the seventh multiplexer MUX7. A logic '0' signal may be applied to a first input terminal of the eighth multiplexer MUX8 and a logic '1' signal may be applied to a second input terminal of the eighth multiplexer MUX8. An output signal of the seventh multiplexer MUX7 may be applied to a selection signal input terminal of the eighth multiplexer MUX8.

The asynchronous detector AD may further include a ninth multiplexer MUX9 and a fourth storage unit SU4. The output signal of the OR gate may be applied to a first input terminal I1 of the ninth multiplexer MUX9 and a signal obtained by inverting the output signal of the AND gate may be applied to a second input terminal I2 of the ninth multiplexer MUX9.

The fourth storage unit SU4 may receive a signal obtained by inverting the reset signal RESET, via INV2, as a clock signal and may receive the digital random signal PUF_DATA as data to transmit the digital random signal PUF_DATA to a selection signal input terminal of the ninth multiplexer MUX9 in accordance with the clock signal.

A validity signal generator VSG may include a NOR gate. The reset signal RESET may be applied to a first input terminal of the NOR gate and an output signal of the ninth multiplexer MUX9 may be applied to a second input terminal of the NOR gate.

When the reset signal RESET is logic '1', the fifth multiplexer MUX5 outputs a logic '0' signal so that the sixth multiplexer MUX6 outputs a logic '0' signal. Therefore, the OR gate outputs the same logic value as that of the digital random signal. In addition, when the reset signal RESET is logic '1', the seventh multiplexer MUX7 outputs a logic '1' signal and the eighth multiplexer MUX8 outputs a logic '1' signal. Therefore, the AND gate also outputs the same logic value as that of the digital random input signal PUF_DATA.

However, when the reset signal RESET is logic '1', data stored in the fourth storage unit SU4 maintains a previously stored value. Since a logic '0' signal obtained by inverting the reset signal RESET is applied to the clock signal of the fourth storage unit SU4, the fourth storage unit SU4 does not operate.

When the reset signal RESET is logic '0', the asynchronous detector AD and the validity signal generator VSG perform detecting operations. Since the fourth storage unit SU4 operates during the detecting operations, a signal PUF_DATA stored in the fourth storage unit SU4 is applied to the selection signal input terminal of the ninth multiplexer MUX9. Therefore, the ninth multiplexer MUX9 may select one of a signal PUF_DATA input to the first input terminal I1 and a signal ~PUF_DATA input to the second input terminal I2 based on the signal PUF_DATA applied to the selection signal input terminal and may output the selected signal.

For example, when the digital random signal PUF_DATA is logic '0', the signal applied to the first input terminal I1 is logic '0' and the signal applied to the second input terminal I2 is logic '1'. The signal applied to the selection signal input terminal of the ninth multiplexer MUX9 is logic '0' so that the ninth multiplexer MUX9 outputs the signal PUF_DATA input to the first input terminal. Therefore, a logic '0' signal (that is, the signal PUF_DATA input to the first input terminal) is applied to the second input terminal of the NOR gate.

When the digital random signal PUF_DATA is logic '1', the signal applied to the first input terminal I1 is logic '1' and the signal applied to the second input terminal I2 is logic '0'. The signal applied to the selection signal input terminal of the ninth multiplexer MUX9 is logic '1' so that the ninth multiplexer MUX9 outputs the signal ~PUF_DATA input to the second input terminal. Therefore, a logic '0' signal (that is, the signal ~PUF_DATA input to the first input terminal) is applied to the second input terminal of the NOR gate.

As a result, whether the digital random signal is logic '0' or logic '1', unless the transition of the digital random signal occurs, the logic '0' signal is applied to the second input terminal of the NOR gate. Since the reset signal RESET is also logic '0' during the detecting operations, the NOR gate outputs a logic '1' signal and the output signal VALID is continuously maintained to be logic '1' unless transition occurs.

When a transition of the digital random signal PUF_DATA from '0' to '1' occurs, the signal applied to the first input terminal I1 and the signal applied to the second input terminal I2 maintain previous logic values, and the signal applied to the selection signal input terminal also maintains a previous logic value, because the RESET signal was not changed. But when the output of the OR gate is transitions to '1', the output value of MUX5 responsively transitions ('0' to '1') and applies the change of output to MUX6 ('0' to '1'), which in turn locks the output of OR gate to be a constant '1', until reset signal RESET is logic 1'. Therefore, the ninth multiplexer MUX9 may output a logic '1' signal to the second input terminal of the NOR gate.

In addition, when transition of the digital random signal PUF_DATA from '1' to '0' occurs, the signal applied to the first input terminal I1 and the signal applied to the second input terminal I2 maintain previous logic values, and the signal applied to the selection signal input terminal also maintains a previous logic value, because the RESET signal was not changed. But the same time the output of AND gate transitions to '0', which in turn changes the output value of MUX7 ('1' to '0'), which is applied to the change of output of MUX8 ('1' to '0'), which in turn locks the output of AND gate to be a constant '0', until reset signal RESET is logic '1'. This constant '0' value is inverted into '1' by inverter INV1 connected to the output of AND gate. Therefore, the ninth multiplexer MUX9 may output a logic '1' signal to the second input terminal of the NOR gate.

Therefore, when the transition occurs, the logic '1' signal is applied to the second input terminal of the NOR gate. As a result, the NOR gate outputs a logic '0' signal. The output signal VALID is continuously maintained to be logic '0' until the reset signal RESET is logic '1'.

As a result, the security device 100m, according to the embodiment, may be generalized to have a configuration in which the digital random signal PUF_DATA is applied to the first input terminal I1 of the ninth multiplexer MUX9, the signal obtained by inverting the digital random signal PUF_DATA is applied to the second input terminal I2 of the ninth multiplexer MUX9, and the digital random signal is again applied to the selection signal input terminal of the ninth multiplexer MUX9. Although not shown, the inverted form of the digital random signal PUF_DATA may be input to the selection signal input terminal of the ninth multiplexer MUX9 instead of the digital random signal.

FIG. 35 is an embodiment of a timing diagram illustrating signals of the security device 100m of FIG. 34. As illustrated in FIG. 35, it is noted that the security device 100m according to the embodiment detects the transition (for example, the transition from '0' to '1' or the transition from '1' to '0') of the digital random signal PUF_DATA to generate the output signal VALID (for example, logic '0') that represents whether a signal is valid while the reset signal RESET is logic '0'.

The validity detecting unit VD of the security device 100m according to the embodiment may be implemented by only one storage unit. Therefore, the implementation area of the validity detecting unit VD of the security device 100m may be smaller than that of the validity detecting unit VD of the security device 100l that requires two storage units, according to the embodiment of FIG. 32.

Figure 36:
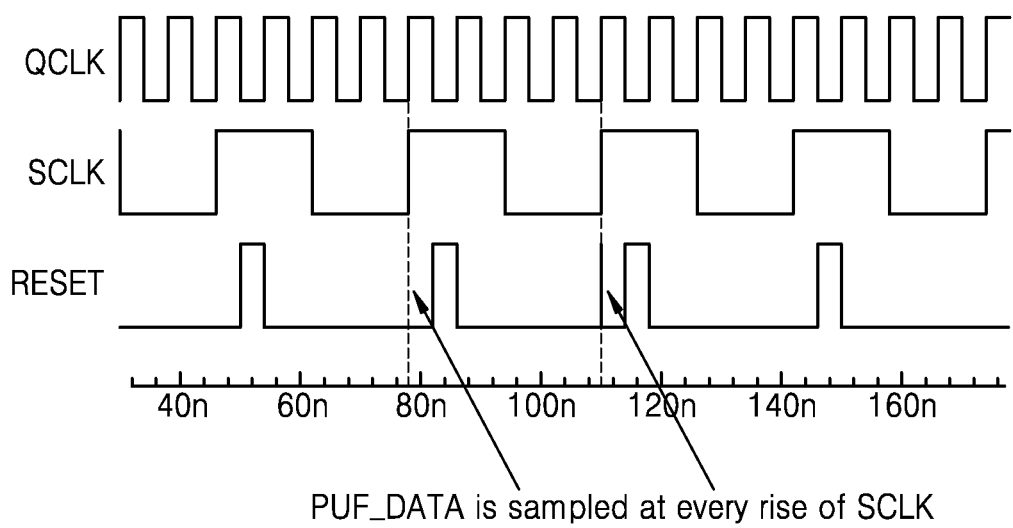
FIG. 36 is a timing diagram illustrating an embodiment of processes of generating a reset signal of a security device according to aspects of the inventive concept.

FIG. 36 is an embodiment of a timing diagram illustrating processes of generating a reset signal RESET of a security device according to aspects of the inventive concept. Referring to FIG. 36, a first clock signal QCLK (quick clock signal) and a second clock signal SCLK (slow clock signal) are generated. A period of the QCLK signal may be ¼ of that of the SCLK signal, the QCLK signal and the SCLK signal may be synchronized with each other, and the digital random signal may be sampled at a rising edge of the SCLK signal.

A reset signal RESET may be generated at a falling edge of the QCLK signal to be logic '1' and a reset operation of the security device 100*m* is performed while the reset signal RESET is logic '1'. The reset signal RESET may be logic '0' at a rising edge of the QCLK signal and an operation of detecting validity of the digital random signal may be performed after the reset signal RESET is logic '0'.

As described above, in a period when the reset signal RESET is logic '1', a validity signal is meaningless. The period is referred to as "a blind zone". Since validity of random numbers generated in the period is not detected, it is preferable that the period in which the reset signal RESET is logic '1' be maintained is relatively short.

Since a conventional validity detecting unit VD uses a synchronous configuration, the blind zone is generated every cycle. To be specific, in a conventional configuration, since validity of a digital random signal is performed based on a generated synchronous clock, in a period when the synchronous clock is deactivated, although transition of the digital random signal occurs, it is not possible to detect the transition of the digital random signal.

However, since the security device according to the embodiment of the inventive concept uses an asynchronous configuration, it is possible to minimize the blind zone. As described above, according to the embodiment of the inventive concept, the blind zone is generated only in the period where the reset signal RESET is logic '1'. Therefore, it is possible to minimize the blind zone by minimizing the period in which the reset signal RESET is logic '1'.

The blind zone may be minimized by controlling a period ratio (that is, a frequency ratio) between the QCLK signal and the SCLK signal. The frequency ratio between the QCLK signal and the SCLK signal illustrated in FIG. 36 is 4:1, for this embodiment. However, when the frequency ratio between the QCLK signal and the SCLK signal are changed into, for example, 8:1, the blind zone (that is, a time period in which the validity detecting unit VD may not detect transition or fluctuation of the digital random signal) may be reduced to ½.

Figure 37:
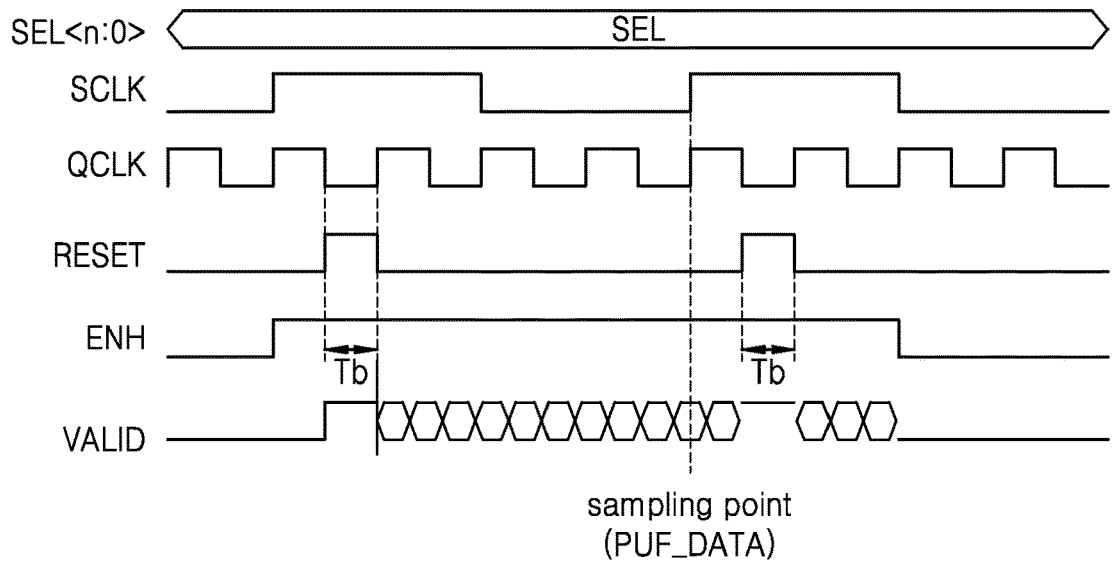
FIG. 37 is a timing diagram illustrating an embodiment of a reset signal and other signals of a security device according to aspects of the inventive concept.

FIG. 37 is an embodiment of a timing diagram illustrating a reset signal RESET and other signals of a security device according to an embodiment of the inventive concept.

Referring to the embodiment of FIG. 37, as described in FIG. 36, the reset signal RESET may be generated using the SCLK signal and the QCLK signal and the period (that is, a time period in which the reset signal RESET remains logic '1' before being changed into logic '0') in which the reset signal RESET is generated corresponds to the blind zone Tb.

In FIG. 37, it is illustrated that the reset signal RESET is generated using two signals (the SCLK signal and the QCLK signal). However, the inventive concept is not limited thereto and the reset signal may be generated using only one signal, that is, the SCLK signal and a signal obtained by delaying the SCLK signal. That is, after generating a delay signal based on the SCLK signal, the reset signal may be generated at a rising edge of the delay signal.

In periods other than the blind zone, validity of the digital random signal may be validly detected so that the validity signal of the digital random signal may be generated. Among the signals illustrated in FIG. 37, a signal ENH means an enable signal EN for the validity detecting unit VD and a signal SEL<n:0> may correspond to the selection signal applied to the first combination unit (or applied to the decoder connected to the first combination unit) according to the above-described embodiments.

Figure 38:
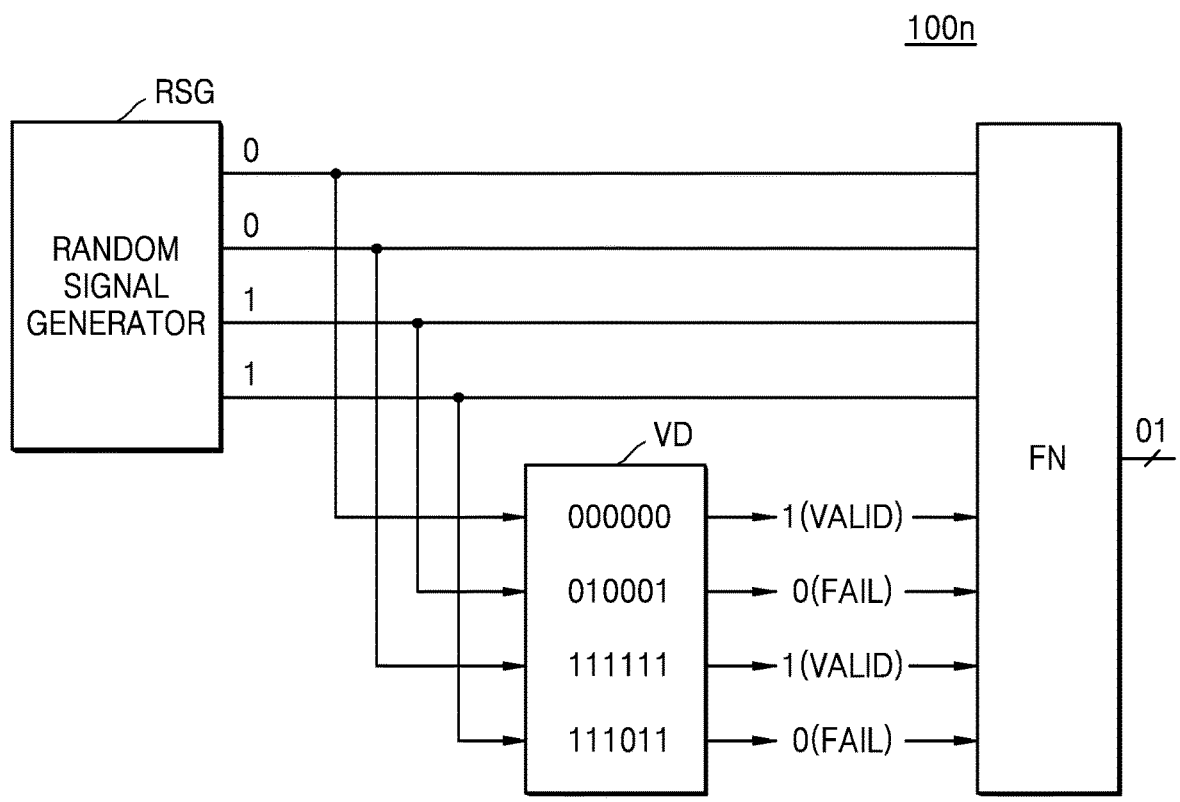
FIG. 38 is a block diagram schematically illustrating another embodiment of a security device according to aspects of the inventive concept.

FIG. 38 is a block diagram schematically illustrating an embodiment of a security device 100*n* according to another aspect of the inventive concept.

Referring to the embodiment of FIG. 38, a first digital random signal generated by a random signal generator RSG may be '0', a second digital random signal may be '0', a third digital random signal may be '1', and a fourth digital random signal may be '1'. A validity detecting unit VD may detect validity (that is, fluctuation) of the first to fourth digital random signals.

In a virtual experiment result, transition of the firth and third digital random signals does not occur so that the first and third digital random signals may be determined as valid signals. In this case, the validity detecting unit VD may transmit a logic '1' signal representing that the first and third digital random signals are valid to a finalizer FN.

On the other hand, transition of the second and fourth digital random signals occurs in a detecting period so that the second and fourth digital random signals may be determined as non-valid signals. In this case, the validity detecting unit VD may transmit a logic '0' signal to the finalizer FN indicating that the second to fourth digital random signals are not valid.

The finalizer FN may receive validity signals from the validity detecting unit VD to output the first digital random signal (logic '0') and the third digital random signal (logic '1'), having time-invariant characteristics among the first to fourth digital random signals, as final digital random signals.

Figure 39:
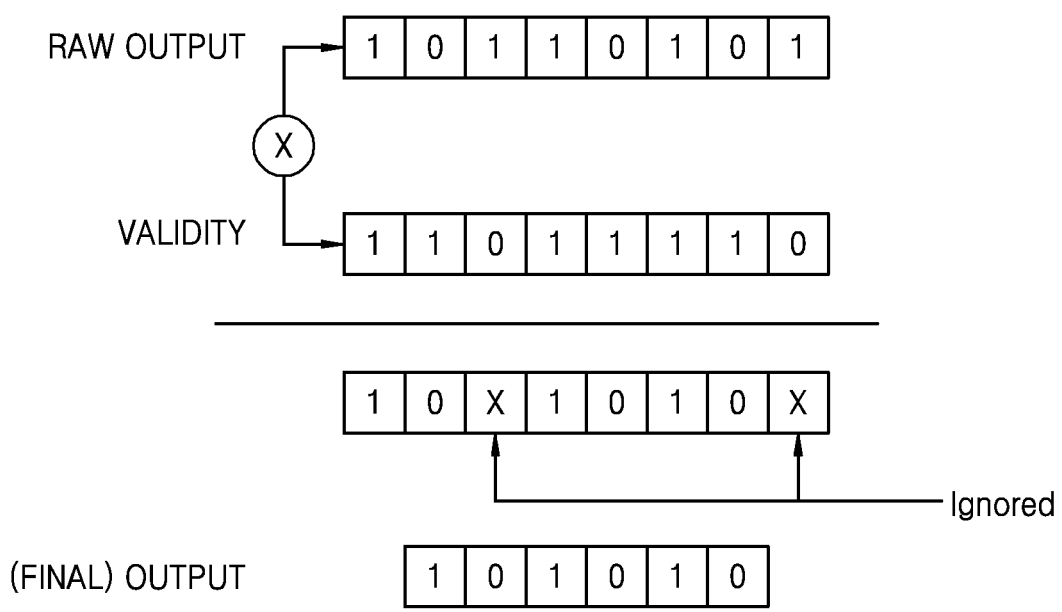
FIG. 39 illustrates an embodiment of a detailed exemplary configuration of a finalizer.

An embodiment of a detailed exemplary configuration of the finalizer FN is illustrated in FIG. 39. Referring to the embodiment of FIG. 39, the finalizer FN may receive a plurality of digital random signals and validity signals for the digital random signals and may output digital random signals corresponding to the validity signals as final digital random signals only when the validity signals are logic '1'.

Figure 40:
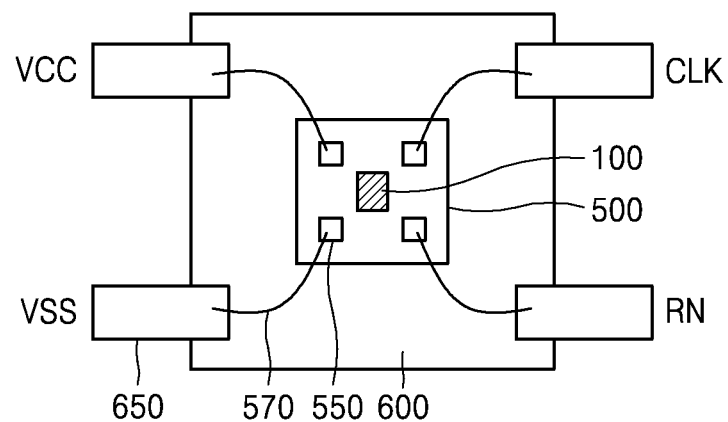
FIG. 40 is a plan view schematically illustrating an embodiment of a semiconductor package in which a security device is implemented according to aspects of the inventive concept.

FIG. 40 is a plan view schematically illustrating an embodiment of a semiconductor package in which a security device is implemented according to aspects of the inventive concept. A semiconductor package according to the embodiment may include a security device according to the above-described embodiments.

Referring to the embodiment of FIG. 40, a security device 100 may be implemented on a semiconductor chip 500 and the semiconductor chip 500 may be mounted on a printed circuit board (PCB) 600. A chip pad 550 of the semiconductor chip 500 may be electrically connected to an external terminal 650 of the PCB 600 through a bond wire 570, for example. Therefore, a first power supply VCC, a second power supply VSS, and a clock signal CLK applied from the external terminal 650 may be applied to the semiconductor chip 500 through the bond wire 570 and a random signal RN generated by the security device 100 may be output to the external terminal 650 through the chip pad 550 and the bond wire 570. The packaging method and configuration illustrated in FIG. 40 is only an example and the semiconductor package may be implemented using other various packaging methods and configurations.

Figure 41:
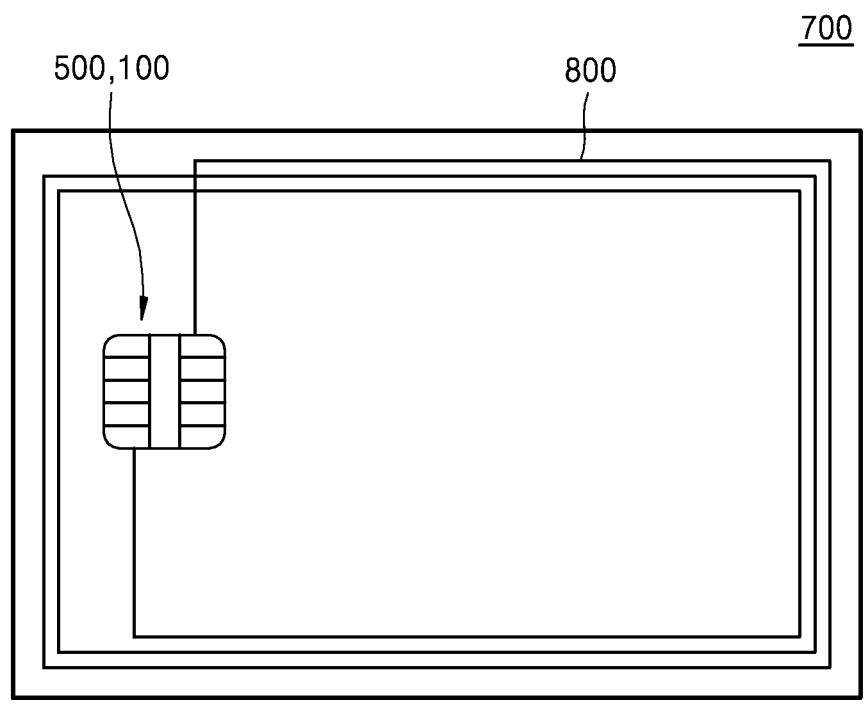
FIG. 41 is a plan view schematically illustrating an embodiment of a smart card in which a security device is implemented according to aspects of the inventive concept.

FIG. 41 is a plan view schematically illustrating an embodiment of a smart card 700 in which a security device 100 is implemented according to aspects of the inventive concept. A smart card 700 according to the embodiment may include the security device 100 according to the above-described embodiments.

Since authentication of a card user is basically performed by the smart card 700, authentication between a card reader (not shown) and the smart card 700 is required. The authentication may be performed by, for example, the card reader receiving authentication information stored in the smart card 700 to check authority. In this case, since it is necessary to maintain security for the authentication information, it is necessary to implement an appropriate algorithm for encoding the authentication information and a security device used for the algorithm.

The semiconductor chip 500 may include the security device according to the embodiments of the inventive concept in order to perform the above-described authentication.

An antenna 800 may receive a power supply from the card reader to transmit the received power supply to the semiconductor chip 500 that includes the security device 100 or may transmit the encoded authentication information generated by the semiconductor chip 500.

Figure 42:
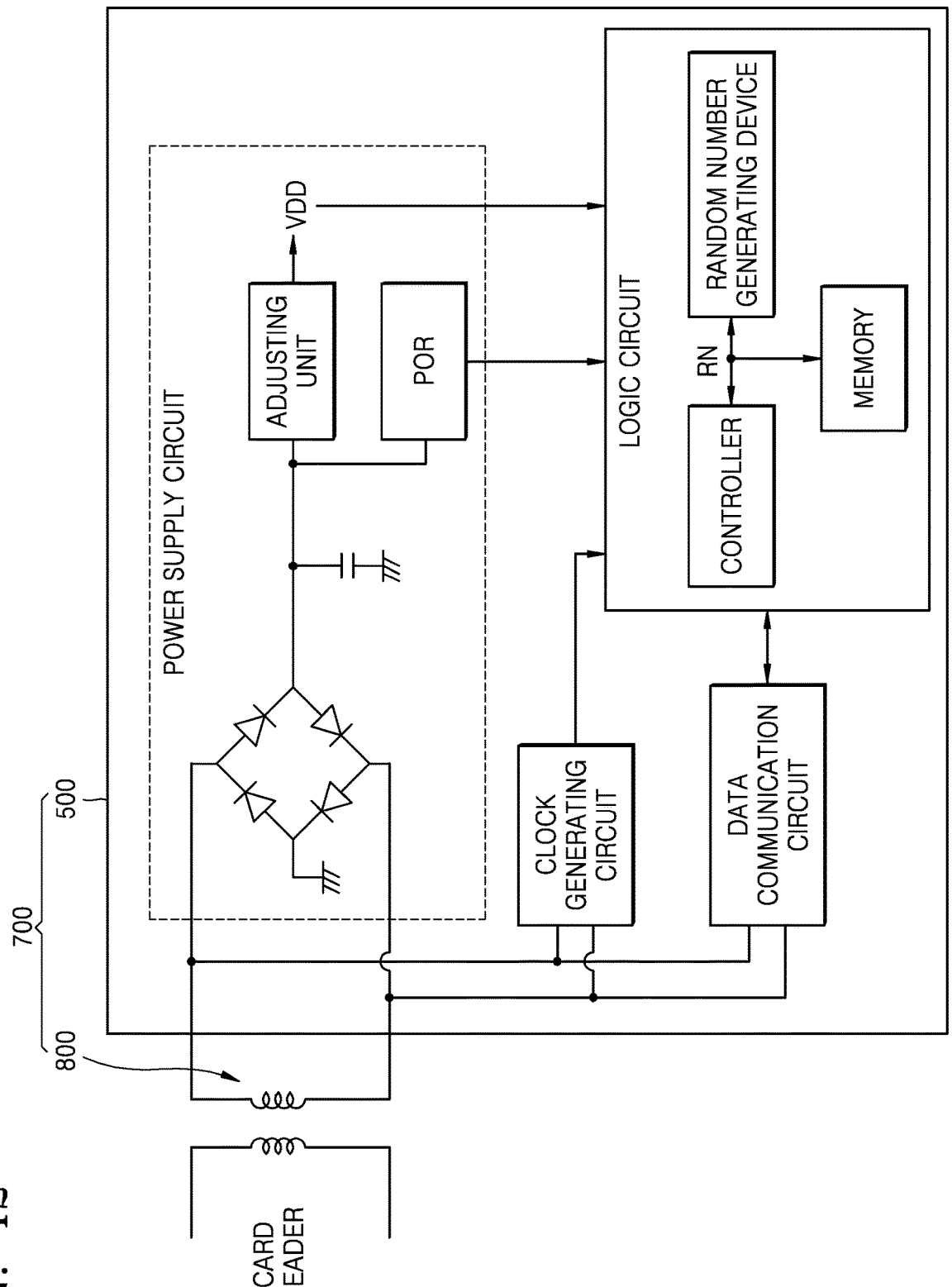
FIG. 42 is a circuit diagram illustrating an embodiment of a semiconductor chip of the smart card of FIG. 41 in detail.

FIG. 42 is an embodiment of a circuit diagram illustrating a semiconductor chip of the smart card of FIG. 41 in detail.

Referring to the embodiment of FIG. 42, the semiconductor chip 500 may include a power supply circuit, a clock generating circuit, a logic circuit, and a data communication circuit.

The power supply circuit may generate a direct current (DC) power supply based on an alternating current (AC) signal received from the antenna 800. In addition, the power supply circuit may include a power on reset circuit for resetting previously stored data as the power supply is applied.

The clock generating circuit may convert the AC signal received from the antenna 800 into a clock signal CLK to apply the clock signal CLK to the logic circuit.

The logic circuit may include a controller CONTROLLER, a memory MEMORY, and a security device RANDOM NUMBER GENERATING DEVICE. The security device generates a final digital random signal RN. Since the configuration of the security device is illustrated in the above-described embodiment, description thereof will be omitted. The controller may be configured to encode the authentication information based on the final digital random signal RN generated by the security device. The memory stores the authentication information, the final digital random signal RN, and the encoded authentication information.

The data communication circuit processes the information received from the card reader and the antenna 800 to transmit the processed information to the logic circuit or processes the encoded authentication information generated by the logic circuit to transmit the processed authentication information to the antenna 800 and the card reader.

It should be understood that the shapes of the respective elements of the drawings attached are only exemplary. The shapes may have various modifications. Unless otherwise indicated, the same elements in the drawings are denoted by the same reference numerals.

While the inventive concept has been particularly shown and described with reference to exemplary embodiments thereof, it will be understood that various changes in form and details may be made therein without departing from the spirit and scope of the following claims.

What is claimed is:

1. A security device comprising:
a random signal generating circuit configured to generate a plurality of digital random signals;
a validity detecting circuit configured to detect validity of each of the plurality of digital random signals; and
a finalizer configured to output a plurality of final digital random signals,
wherein the validity detecting circuit comprises:
an asynchronous detector configured to detect transition of each of the plurality of digital random signals, and output a plurality of output signals including first output signals and second output signals, and
a validity signal generator configured to generate a plurality of validity signals in response to the plurality of output signals,
wherein the asynchronous detector comprises:
a first storage circuit configured to receive a plurality of first clock signals generated based on the plurality of digital random signals and output the first output signals, and
a second storage circuit to receive a plurality of second clock signals generated based on the plurality of digital random signals and output the second output signals.

2. The security device of claim 1, wherein the first storage circuit is configured to receive the plurality of digital random signals as the first clock signals, and
the second storage circuit is configured to receive a plurality of inverted digital random signals that are generated by inverting the plurality of digital random signals as the second clock signals.

3. The security device of claim 1, wherein the validity signal generator is configured to detect transition of each of the plurality of digital random signals and to determine whether each of the plurality of digital random signals are time-invariant.

4. The security device of claim 1, wherein the finalizer is configured to determine whether to exclude at least one of the plurality of digital random signals based on the plurality of validity signals.

5. The security device of claim 1, wherein each of the plurality of final digital random signals is time-invariant.

6. The security device of claim 1, wherein the finalizer is configured to output the plurality of final digital random signals based on the plurality of digital random signals and the plurality of the validity signals.

7. The security device of claim 1, wherein a number of the plurality of final digital random signals is less than a number of the plurality of digital random signals.

8. The security device of claim 1, wherein a number of the plurality of validity signals is the same as a number of the plurality of digital random signals.

9. The security device of claim 1, wherein the validity signal generator is configured to compare the plurality of the output signals using at least one logic gate to generate the plurality of validity signals.

10. A security device comprising:
a random signal generating circuit configured to generate a plurality of digitized signals;
a validity detector configured to detect transition of each of the plurality of digitized signals, detect validity of each of the plurality of digitized signals by using a time-invariant characteristic of each of the plurality of digitized signals, and generate a plurality of validity signals; and
a finalizer configured to receive the plurality of digitized signals and the plurality of validity signals and output a plurality of valid digitized signals among the plurality of digitized signals based on the plurality of validity signals,
wherein a number of the plurality of validity signals is the same as a number of the plurality of digitized signals,
wherein a number of the plurality of valid digitized signals is less than the number of the plurality of digitized signals,
wherein the plurality of validity signals correspond to the plurality of digitized signals, respectively, and wherein each of the plurality of validity signals indicates whether a corresponding digitized signal is time-invariant.

11. The security device of claim 10, wherein the validity detector comprises:
   an asynchronous detector configured to detect transition of each of the plurality of digitized signals and to output a plurality of output signals including first output signals and second output signals, and
   a validity signal generator configured to generate the plurality of validity signals in response to the plurality of output signals.

12. The security device of claim 11, wherein the asynchronous detector comprises:
   a first storage circuit configured to receive a plurality of first clock signals generated based on the plurality of digitized signals and to output the first output signals, and
   a second storage circuit configured to receive a plurality of second clock signals generated based on the plurality of digitized signals and to output the second output signals.

13. The security device of claim 12, wherein the first storage circuit is configured to receive the plurality of digitized signals as the first clock signals, and
   the second storage circuit is configured to receive inverted digitized signals that are generated by inverting the plurality of digitized signals as the second clock signals.

14. The security device of claim 11, wherein the validity signal generator is configured to compare the plurality of the output signals using at least one logic gate and generate the plurality of validity signals.

15. The security device of claim 10, wherein the finalizer is configured to determine whether to exclude at least one of the plurality of valid digitized signals based on the plurality of validity signals.

16. The security device of claim 10, wherein the finalizer is configured to output the plurality of valid digitized signals based on the plurality of digitized signals and the validity signals.

17. A method of determining validity of a plurality of random signals using a semiconductor security device, the method comprising:
   generating a plurality of analog random signals;
   digitizing the plurality of analog random signals to generate a plurality of digital random signals;
   detecting validity of each of the plurality of digital random signals to generate a plurality of validity signals based on a time-invariant characteristic of each of the plurality of digital random signals;
   determining whether to exclude the each of the plurality of digital random signals based on a corresponding one of the plurality of validity signals; and
   outputting a plurality of valid digital random signals in accordance with a result of the determining whether to exclude the each of the plurality of digital random signals,
   wherein a number of the plurality of validity signals is the same as a number of the plurality of digital random signals,
   wherein a number of the plurality of valid digital random signals is less than the number of the plurality of digital random signals,
   wherein the plurality of validity signals correspond to the plurality of digital random signals, respectively, and
   wherein each of the plurality of validity signals indicates whether a corresponding digital random signal is time-invariant.

18. The method of claim 17, wherein the detecting the validity of each of the plurality of digital random signals includes generating a plurality of first clock signals and a plurality of second clock signals based on the plurality of digital random signals.

19. The method of claim 17, wherein the detecting the validity of each of the plurality of digital random signals includes generating a plurality of first clock signal by using at least one of the plurality of digital random signals and generating a plurality of second clock signal by using an inverted signal of the at least one of the plurality of digital random signals.

* * * * *